United States Patent [19]

Oklejas, Jr. et al.

[11] Patent Number: 4,830,572
[45] Date of Patent: May 16, 1989

[54] IDLER DISK

[76] Inventors: Eli Oklejas, Jr., 136 Bur Oak Ct.; Robert Oklejas, 774 E. Hurd Rd., both of Monroe, Mich. 48161

[21] Appl. No.: 930,729

[22] Filed: Nov. 13, 1986

[51] Int. Cl.⁴ .............................................. F01D 11/00
[52] U.S. Cl. ....................................... 415/110; 415/62
[58] Field of Search ................... 415/62, 69, 104, 110, 415/111, 170 A, 172 R

[56] References Cited

U.S. PATENT DOCUMENTS

| | | |
|---|---|---|
| 803,759 | 11/1905 | Herles et al. |
| 921,118 | 5/1909 | Kasley |
| 1,032,828 | 7/1912 | Hayton |
| 2,680,410 | 6/1954 | Kolb ..................................... 415/111 |
| 2,864,314 | 5/1955 | Culleton ......................... 415/170 A |
| 3,927,951 | 12/1975 | Mitsuhashi ....................... 415/170 A |
| 4,408,953 | 10/1983 | Nasvytis et al. |

FOREIGN PATENT DOCUMENTS

| | | |
|---|---|---|
| 3330364 | 3/1985 | Fed. Rep. of Germany ....... 415/104 |
| 81028 | 9/1919 | Switzerland ........................... 415/62 |
| 548180 | 9/1942 | United Kingdom |
| 2071765 | 9/1981 | United Kingdom |

OTHER PUBLICATIONS

U. M. Barske, "Development of Some Unconventional Centrifugal Pumps", *Proceeding of the Institute of Mechanical Engineering* (Great Britain), vol. 174, No. 11, 1960.

C. Rodgers and H. Mnew, "Experiments With a Model Free Rotating Vaneless Diffuser", *Journal of Engineering for Power*, Apr. 1975.

*Primary Examiner*—Robert E. Garrett
*Assistant Examiner*—Therese M. Newholm
*Attorney, Agent, or Firm*—Emch, Schaffer, Schaub & Porcello Co.

[57] ABSTRACT

An idler disk for reducing fluid drag forces in a machine having a rotating component is disclosed. An outer housing is provided for the machine and a cavity is defined in the outer housing. The cavity has opposed side walls. A rotatable component is positioned in the cavity and the rotatable component is spaced apart from the side walls of the cavity. At least one freely rotatable idler disk is positioned in the cavity and the idler disk is in spaced apart relationship with the rotatable component and the side walls of the cavity. The idler disk extends in the cavity along at least a portion of the length of the rotatable component. The idler disk is caused to rotate in the same direction as the rotatable component by the rotating fluid in the cavity. The fluid is caused to rotate by the rotation of the rotatable component. The rotating idler disk increases the speed of the fluid rotating adjacent the rotatable component and thereby reduces the fluid drag on the rotatable component. An outer seal means forms a seal between the idler disk and the rotatable component to control the flow of fluid between the idler disk and the rotatable component. The outer seal means is positioned adjacent the outer periphery of the rotatable component and the idler disk. The outer seal means acts to equalize the axial forces on the sides of the idler disk to maintain the idler disk in a desired equilibrium position where the idler disk is maintained in spaced apart relationship from the rotatable component and the side walls of the cavity.

54 Claims, 8 Drawing Sheets

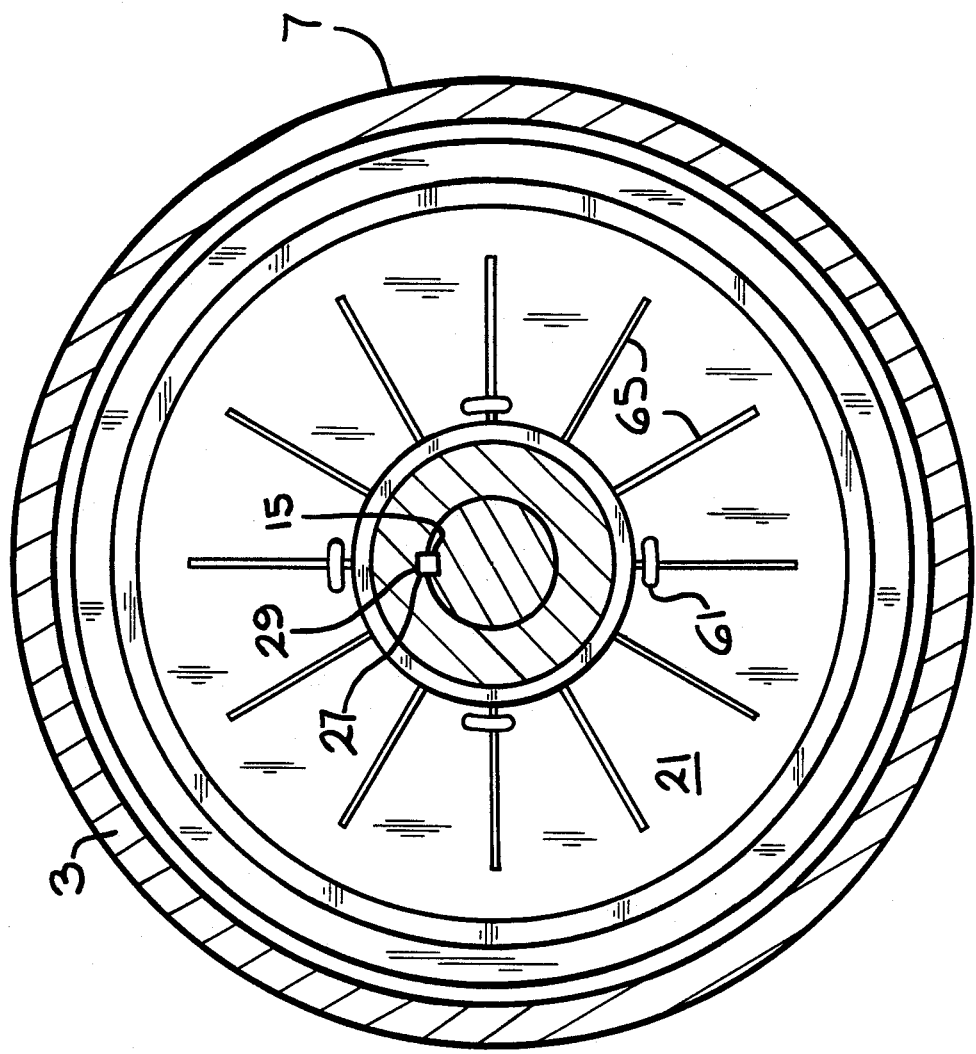
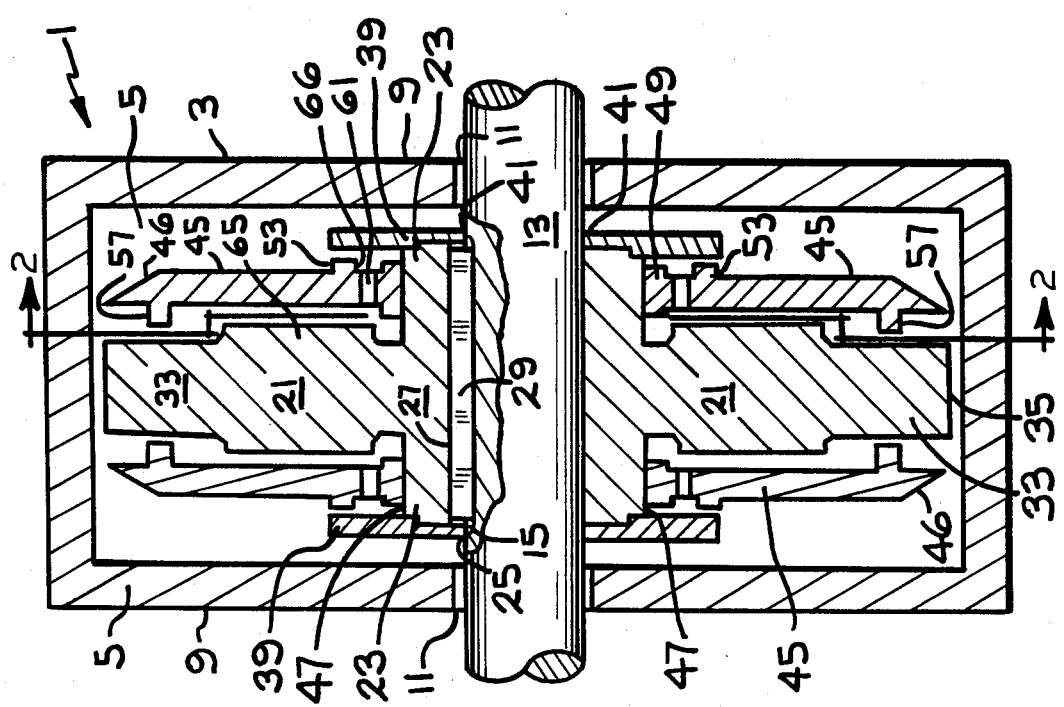

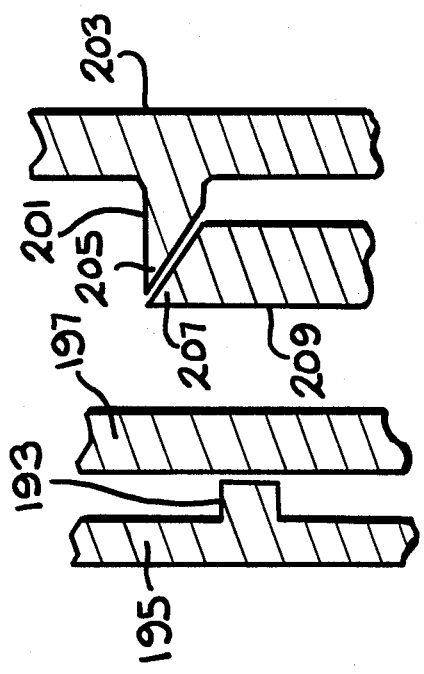
FIG. 10A  FIG. 10B
FIG. 10C  FIG. 10D
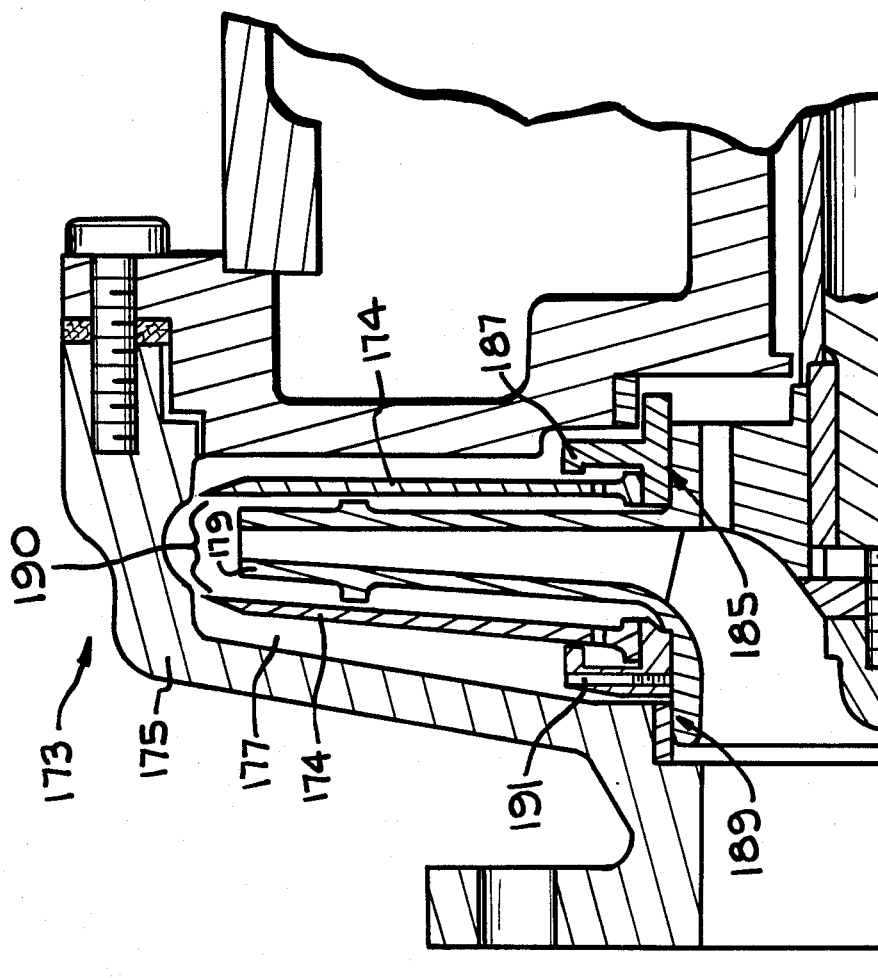
FIG. 9

IDLER DISK

BACKGROUND OF THE INVENTION

The invention relates to any type of rotating machinery such as centrifugal pumps, water and gas turbines, electric motors and generators. The invention deals with the way to reduce the frictional drag that is present in this types of machinery due to the rotating components of the machinary.

It is inevitable that the rotating components on such machinery will experience a retarding drag force that is developed by the fluid surrounding the rotating component. To facilitate the explanation of the invention the rotating component will be described as being a rotor surrounded by a casing. Filling the casing is a fluid such as air or water. In actual machines, the rotor may be a pump impeller as in the case of a centrifugal pump or compressor or it may be an armature in the case of an electric motor or generator.

When the rotor is rotating, a drag force is generated that acts against the direction of rotor rotation. The drag force that is generated is a direct consequence of the fact that the fluid mass in the machinery is simultaneously in contact with the moving rotor and the stationary casing for the machinery. This results in a drag force being transmitted through the fluid. Essentially, the rotor causes the fluid to rotate in the direction of rotation of the rotor due to the viscosity of the fluid. However, since the fluid is also in contact with the stationary outer casing the fluid motion is resisted by the casing. The result is that the rotor experiences a retarding drag force caused by the fluid in the casing. It should be noted that this fluid is present as an unavoidable consequence of the normal operation of the machine. For example, the fluid may be water (in the case of a centrifugal pump) or air (in the case of an electric motor).

The retarding drag force generated by the rotor rotation absorbs power. The amount of power absorbed primarily depends on the size of the rotor, speed of rotor rotation, the physical properties of the surrounding fluid (density and viscosity) and the clearance between the rotor and the surrounding casing. Well-designed rotating machines usually have the proper rotor shape and clearance between the casing and rotor in order to achieve reduce drag losses originating from fluid drag on the rotor.

Even with the proper rotor shape and clearance between the rotor and casing, the rotor drag losses can be very high. An example will highlight the power losses than can be generated as a result of the retarding drag loss on a rotor. A centrifugal pump with an impeller 13 inches in diameter and rotating at 3600 rpm in water will experience a drag can exceed 20 hp. This is up to 30% of the power needed by the pump to operate.

In order to understand the operating principles of the invention, it is first necessary to understand the basic factors that determine the amount of fluid drag acting on a rotor. For simplicity, the rotor will be assumed to be shaped like a disk with a negligible thickness. There are three major factors that influence drag losses on a rotor operating in a given fluid. The first factor is the general shape of the rotor and casing, the surface roughness of the rotor and surrounding casing and the clearance between the rotor and casing. For well-designed rotating machines, the rotor and casing surfaces are smooth and unbroken and the clearance between the rotor and casing is relatively small. These design features all tend to reduce the amount of fluid drag acting against rotor rotation.

Another factor is the speed of rotation of the rotor. The drag force acting on the rotor is approximately proportional to the square of the speed of rotation. For example, doubling the speed of rotation increases the drag force by four times (i.e., $2^2$) and tripling the speed of rotation will increase the drag force by nine times (i.e., $3^2$). Likewise reducing the speed of rotation by one-half reduces the fluid drag acting on the rotor to one-fourth of the original value (i.e., $5^2$).

The third factor is the diameter of the rotor. For a given speed of rotation, the drag loss varies with the fifth power of the diameter. For example, doubling the diameter will increase the drag power loss by 32 times (i.e., $2^5$). Tripling the diameter increases the drag power loss by 243 times (i.e., $3^5$). Tripling the diameter increases the drag power loss by 243 times (i.e., $3^5$).

For many design reasons, a large diameter rotor is desirable. For example, in the case of a centrifugal pump, a large diameter rotor (or impeller as the rotor is normally called in a centrifugal pump) develops higher pressure than a small diameter rotor operating at the same rpm.

Designers for centrifugal pumps have had to resort to very elaborate schemes to reduce the fluid drag losses in the pumps. The most common way is to use multi-staging. Multi-staging is a technique of using two or more impellers of relatively small diameter. The fluid that is to be pumped passes sequentially through each impeller and each of the impellers provides a portion of the total pressure rise. Multi-stage pumps require very complex passages to route the fluid through the impellers and are therefore very expensive to manufacture. Such multi-stage pumps also contain many surfaces that are subject to high wear conditions and the pumps are therefore, expensive to maintain.

Another technique that has been used to reduce the fluid drag losses acting on the rotor, especially in centrifugal pumps, is to use a small impeller rotating at very high speeds (sometimes exceeding 10,000 rpm). This technique allows the use of a very small diameter impeller to achieve a given pressure increase thereby reducing the fluid drag losses acting on the impeller. This technique has two major drawbacks. One drawback is that a speed multiplier such as a gear box is frequently required between the motor that drives the pump and the pump to produce the high rotation rate. Such an item increases the purchase price and maintenance expense for the pump. The other major drawback is that high speed centrifugal pumps are prone to destructive fluid flow conditions such as cavitation due to the rapid acceleration experienced by the fluid inside the impeller.

The ideal pump for generating high pressure would have a single, large diameter impeller and would operate at relatively low speeds. As indicated above, however, a large diameter impeller creates a large fluid drag loss acting against rotor rotation.

A concept was developed in the early 1900's that theoretically allows fluid drag losses on a rotor to be drastically reduced by using freely rotating disks adjacent to the rotor. This concept is to place a freely rotating disk between the moving rotor and the stationary side wall of the rotor casing.

The amount of drag force acting on a rotor depends on how fast a rotor is revolving relative to the adjacent casing side wall. In typical rotating machinery, the casing side wall is stationary. However, a disk approximately with the same diameter as the rotor can be coaxially positioned between the rotor and the casing side wall. If this disk rotates in the same direction as the rotor the relative velocity between the rotor and the adjacent disk will be reduced resulting in a reduced fluid drag on the rotor.

The fluid mass adjacent to a rotating surface is dragged in the direction of rotation due to the fluid's inherent viscosity and the fluid mass rotates in the same direction as the rotor. The speed of the fluid rotation is approximately equal to the average of the speeds of rotation of the rotor and the casing sidewalls. For example, if the rotor is rotating at 3600 rpm and the casing sidewall is not rotating (which is typically the case), then the fluid mass will rotate at about 1800 rpm.

If a freely rotating disk is placed coaxially between the rotor and the stationary casing it can be shown that the disk rotates at about one-half of the speed of the rotor.

For example, if the rotor is rotating at 3600 rpm, the adjacent freely rotating disk will rotate at about 1800 rpm due to the combination of drag forces exerted by the fluid mass on each side of the disk. The fluid mass located between the freely rotating disk and the rotor revolves at about 2700 rpm which is the average of the 3600 rpm rotational speed of the rotor and the 1800 rpm rotational speed of the freely rotating disk. The fluid mass between the disk and the stationary casing side wall revolves at about 900 rpm which is the average of the 1800 rpm rotational speed of the disk and the 0 rotational speed of the stationary side wall. Note that without the freely rotating disk, the fluid mass rotated at 1800 rpm and with the freely rotating disk the fluid mass adjacent to the rotor rotates at 2700 rpm. This is a reduction of 900 rpm in the relative rotation rate or a reduction of 50%. As discussed earlier, since fluid drag loss obeys the square relationship, this 50% reduction in relative velocity reduces the drag loss by four times. In this example, if the fluid was water, the rotor and disks (one disk on each side of the rotor) are each 12 inches in diameter, then the rotor drag power loss would be about 3.5 horsepower. If the freely rotating disks were not present, then the rotor drag power loss would be about 14 horsepower. In this example the use of freely rotating disks reduces the power required to operate the pump by over 11 horsepower.

Although the concept of using freely rotating disks was suggested in the early 1900's there has been no practical application of this technology to reduce fluid drag losses. This technology has not been utilized for specific reasons due to the dynamics of the fluid pressure that are developed inside rotating machinery which will be more fully set forth below.

A rotating mass of fluid generates a radial pressure gradient having an intensity that is dependent upon the rotation rate of the fluid. Specifically, the pressure developed by the rotating fluid follows a square relationship. Doubling the speed of rotation increases the pressure gradient 4 times. Tripling the rotation rate increases the pressure gradient by 9 times. For example, a mass of water 12 inches in diameter revolving at 3600 rpm would display a static pressure that is 240 lbs. per square inch higher at its periphery than at its center of rotation.

As indicated earlier, the fluid located between the freely rotating disks and the rotor rotates at about 3 times faster than the fluid rotating between the freely rotating disks and the stationary casing. Therefore, the rotating fluid mass between the disks and rotor will generate a pressure gradient about 9 times greater than the pressure gradient generated by the fluid between the disks and the casing side wall. For example, a 12 inch diameter rotor running at 3600 rpm in water with a 12 inch freely rotating disk will generate 135 lbs. per square inch pressure difference between the rotor center and the rotor periphery in the space between the disk and the rotor (here the fluid revolves at 2700 rpm). The fluid located between the disk and the stationary casing side wall will generate a pressure difference of about 15 lbs. per square inch between the center and the periphery of the disk (here the fluid revolves at 900 rpm). These unequal pressure gradients can create a very strong force on the freely rotating disk that acts in the axial direction. This axial force is a major problem that has prevented the commercial application of freely rotating disks.

In this case, the pressure at the center of the fluid mass located in the space between the disk and rotor will be 135 lbs. per square inch lower than the pressure at the outer periphery of the disk. Also, the pressure at the center of the fluid mass located in the space between the disk and the stationary side wall will be 15 lbs. per square inch lower than the pressure at the outer periphery of the disk. As is clear from the above, the fluid pressure is generally lower in the fluid mass between the disk and the rotor than the fluid pressure in the fluid mass between the disk and the stationary side wall. The generally higher pressure in the fluid mass between the disk and stationary side wall pushes the disk axially toward the rotor with a force that, in this example, exceeds 3,000 lbs.

On the otherhand, if the pressure is equal on both sides of the disk at the disk center and there are seals at the outer periphery of the disk to allow a pressure difference to exist at the outer periphery, then the pressure at the outer periphery in the fluid mass located between the disk and the rotor will be 135 lbs. per square inch higher than the pressure existing at the center of the fluid mass. Also, the pressure at the outer periphery of the fluid mass located between the disk and the stationary side wall will be 15 lbs. per square inch higher than the pressure existing at the center of the disk. The generally higher pressure in the fluid mass between the disk and the rotor pushes the disk axially toward the stationary side wall with a force that, in this example, exceeds 3,000 lbs.

From the above, it is clear that a powerful axial force caused by the differing pressure gradients on either side of the disk will act to force the disk either toward the rotor or toward the stationary side wall. The direction of this force depends on whether the pressures are equalized on both sides of the disk at the outer periphery or at the center of the disk.

In the past, it has been indicated that bearings can be used to maintain proper position of such a freely rotating disk. However, the ratio of axial force to allowable bearing drag force can easily exceed one thousand to one (for example, the bearing drag should not exceed 3 lbs. of force yet that same bearing must be able to handle 3,000 lbs. of axial force). Friction thrust bearings can not reliably achieve this level of performance. Anti-friction thrust bearings (e.g. roller bearings) are very expensive in the required sizes (bore size can frequently be larger than 12 inches), must operate in the fluid surrounding the rotor (which is typically non-lubricating and may be corrosive, abrasive and/or hot), and must take an absolute minimum of room. Anti-friction thrust bearings would also create high maintenance costs and introduce unfamiliar field maintenance procedures. Thus, the use of bearings has not been an adequate solution to position the freely rotating disk to handle the axial forces that are generated on either side of the disk.

The present invention utilizes a structure that can cancel out the axial forces acting on the freely rotating disk thereby eliminating the need for large and expensive bearings capable of handling high axial thrust loads. The invention utilizes seals that can be located on each side of the idler disk and a pressure equalization port to completely cancel out the axial forces. These components work in a manner that when an imbalance in the axial forces cause the freely rotating disk to move from its desired operating position then the seals and equalization ports create a restoring force that acts in the opposite direction to the imbalancing force thereby restoring the freely rotating disk to the desired operating position. The restoring force is generated in a fraction of a second and acts to move the freely rotating disk either away from the rotor or away from the side walls of the outer casing as required.

SUMMARY OF THE INVENTION

The invention is directed to an idler disk for reducing fluid drag forces in a machine having a rotating component. The machine comprises an outer housing and a cavity is defined in the outer housing. The cavity having opposed side walls. A rotatable component is positioned in the cavity and the rotatable component is spaced apart from the side walls of the cavity. At least one freely rotatable idler disk is positioned in the cavity. The idler disk is in spaced apart relationship with the rotatable component in the side walls of the cavity. The idler disk extends in the cavity along at least a portion of the length of the rotatable component. The idler disk is caused to rotate in the same direction as the rotatable component by the rotating fluid in the cavity. The fluid is caused to rotate by the rotation of said rotatable component. The rotating idler disk increases the speed of the fluid rotating adjacent the rotatable component and thereby reduces the fluid drag upon the rotatable component. An outer seal means forms a seal between the idler disk and the rotatable component to control the flow of fluid between the idler disk and the rotatable component. The outer seal means is positioned adjacent the outer periphery of the rotatable component in the idler disk. At least one passageway is positioned in the idler disk. The passageway is positioned adjacent the center of the idler disk and fluid in the cavity flows through the passageway. The passageway acts to equalize the pressure on the sides of the idler disk to maintain the idler disk in a desired equilibrium position. In the equilibrium position, the idler disk is maintained in spaced apart relationship from the rotatable component and the side walls of the cavity.

According to the invention there is also provided a method for reducing the losses due to fluid frictional drag in rotating machinery. In the method a component of the machinery is caused to rotate in a cavity. At least one idler disk positioned in the cavity is caused to rotate due to the movement of the fluid in the cavity produced by the rotating component. The idler disk is positioned between the component and the side walls of the cavity. A seal is created between the outer periphery of the idler disk and the component. The seal acts to control the fluid between the idler disk and the components. Fluid is passed through at least one passageway in the inner periphery of the idler disk. The flow of fluid across the seal and the fluid passing through the passageway acts to equalize pressure generated axial forces on opposite sides of the idler disk. Equalizing the axial forces maintain the idler disk in the desired position between the side walls and the component whereby the idler disk is free to rotate and reduce the fluid frictional drag on the rotating component.

It is an object of the invention to provide freely rotating idler disk for reducing the fluid drag forces in a machine having a rotating component.

It is another object of the invention to provide freely idler disks that are maintained at or near a desired equilibrium position during the operation of the machine.

It is a further object of the invention to provide idler disks that are constructed in a manner where differentials and fluid force is acting on the idler disks are cancelled out and restoring forces are generated to maintain the idler disks at or near the desired equilibrium position.

These and other objects and advantages of the invention will be more fully understood by referring to the attached drawings in connection with the following description.

BRIEF DESCRIPTION OF THE DRAWINGS

FIG. 1 is a cross-sectional side elevational view of the idler disk invention.

FIG. 2 is a cross-sectional view taken along line 2—2 in FIG. 1.

FIG. 9 is a partial cross-sectional side elevational view of another embodiment of the present invention.

FIG. 10 is a series of partial cross-sectional views of different embodiments for the present invention.

DETAILED DESCRIPTION OF THE PREFERRED EMBODIMENTS

Figure 4:
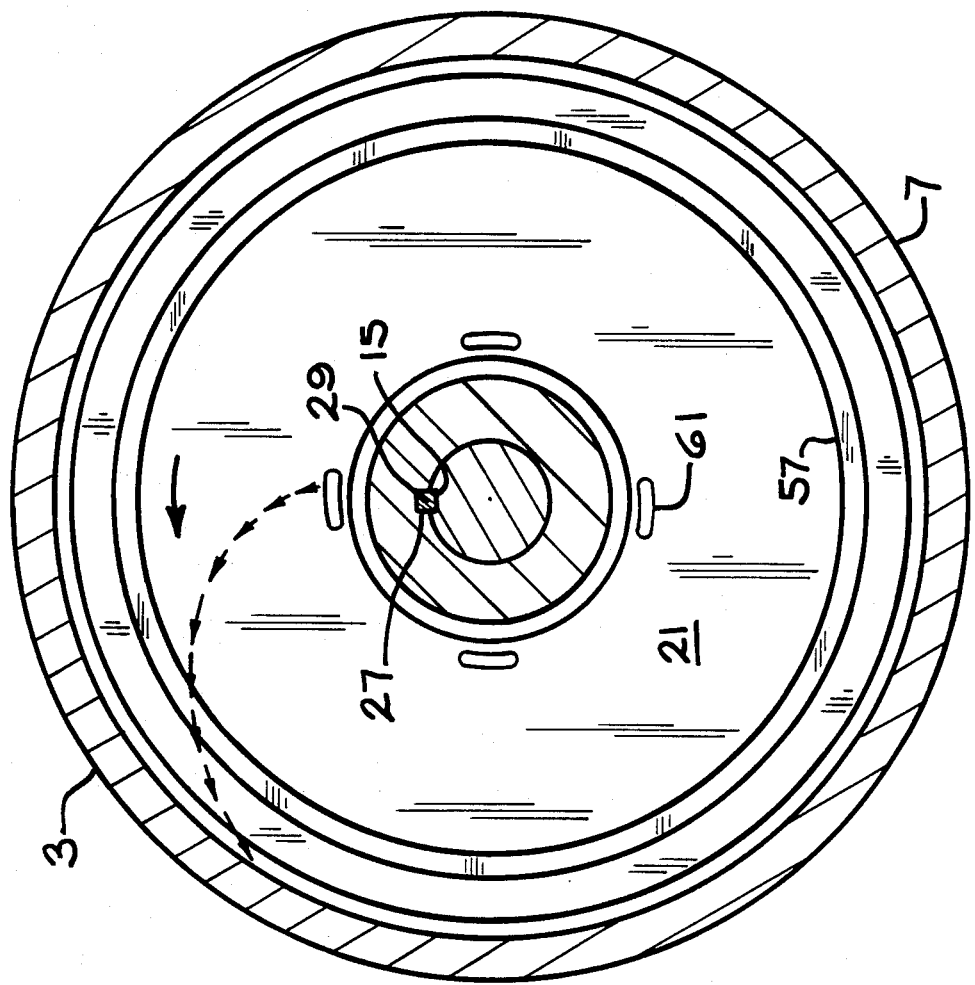
FIG. 4 is a cross-sectional view taken along line 4—4 in FIG. 3.

This invention relates to freely rotating disks which can be used to improve the efficiency of rotating machinery such as centrifugal pumps, centrifugal compressors and blowers, water and gas turbines, electric motors and electric generators. Any rotating component in such machinery will experience a retarding drag force created by the fluid surrounding the rotating component. This fluid may be a gas such as air or may be a liquid such as water. Some type of fluid is always present during the normal operation of the machine and the fluid creates a retarding drag force on the rotating element(s). The freely rotating disks as described below are called idler disks.

To simplify the explanation of the invention, a generalized rotating device is described in FIGS. 1 and 2 that consists of a rotor and a surrounding casing. Rotating device 1 has an outer casing 3 that defines a rotor cavity 5. The outer casing 3 is substantially cylindrical in shape and is comprised of a cylindrical end wall 7 around the outer periphery of the outer casing and opposed substantially parallel side walls 9 are connected to the end wall 7 and enclose the rotor cavity 5. A passageway 11 is positioned in substantially the center of each side wall 9. Rotatably positioned in the passageways 11 is a shaft 13. The shaft is substantially cylindrical in shape and has a keyway 15 cut along one side of the shaft. The keyway is substantially perpendicular to the longitudinal axis of the shaft. Mounted on the shaft 13 is a cylindrically rotor 21. The rotor 21 has a cylindrical shoulder 23 that is positioned adjacent the shaft 13. A passageway 25 extends through the cylindrical shoulder 23. The passageway is designed to accept the shaft 13. A keyway 27 is positioned in the cylindrical shoulder 23 in alignment with the keyway 15 on the shaft 13. A key 29 is positioned in the keyway 15 and keyway 27 to secure the rotor 21 to the rotatable shaft 13.

Extending from the cylindrical shoulder 23 is section 33 of the rotor 21. The section 33 extends from the shoulder 23 in a direction that is substantially perpendicular to the longitudinal axis of the shaft 13. The section 33 terminates at an outer periphery 35 that is adjacent the end wall 7 of the outer casing 3.

Positioned on each end of the cylindrical shoulder 23 is a plate 39. The plates 39 are substantially cylindrical in configuration and have an opening 41 that passes substantially through the center of the plates. The opening 41 is in substantial alignment with the passageway 25 that extends through the rotor 21. The plates 39 are disposed so that they extend in a direction that is substantially perpendicular to the longitudinal axis of the shaft 13. A portion of the plates 39 extend beyond the cylindrical shoulder 23 in a direction towards the end wall 7 of the outer casing 3. Normally, the plates 39 extend beyond the shoulder 23 for a distance that is about 1/15 to about ⅛ of the diameter of the rotor 21.

Mounted on the cylindrical shoulder 23 of the rotor 21 are idler disks 45. There is an idler disk 45 positioned on each side of the section 33 of the rotor 21. The idler disks are substantially cylindrical in shape and have an bore 47 that extends substantially through the center of the idler disk. The bore 47 is designed to accept the cylindrical shoulder 23 of the rotor 21 and there is a clearance fit between the shoulder and the idler disk. The idler disks are free to rotate and are free to move axially along the shoulder 23 between the section 33 and the plates 39. The idler disks 45 can have a section 49 that is adjacent the bore 47 that has a greater width than the remainder of the idler disk. The section 49 provides a greater bearing surface for the slideable mounting of the idler disk 45 on the cylindrical shoulder 23 of the rotor 21. The greater bearing surface helps to resist radial force loadings on the idler disk 45. The radial clearance between the bore 47 of the idler disk 45 and the cylindrical shoulder 23 of the rotor 21 must be small enough to minimize radial movement. A radial clearance of approximately 0.001 of an inch per inch of the bore 47 diameter is usually required. The idler disks extend from the shoulder 23 in a direction towards the end wall 7 of the outer casing 3. The idler disks 45 are positioned to be substantially parallel to the section 33 of the rotor 21. Normally, the idler disk will have a diameter that is at least about ½ of the diameter of the rotor 21. In practice it has been found to be advantageous to have the idler disk have a diameter that is from about ¾ to about 1¼ of the diameter of the rotor 21. The idler disk must be made from material strong enough to resist the centrifugal forces of rotation and to resist warping caused by unequal pressure distribution on either side of the disk. The idler disk material must also be compatible with the fluid in the rotor cavity 5. For most applications, 316 stainless steel will be a satisfactory material for the idler disk 45.

An inner seal 53 extends from the idler disk 45 in a direction towards the plate 39. The inner seal 53 is disposed adjacent the cylindrical shoulder 23 so that the inner seal is positioned adjacent the plates 39. The inner seal is spaced apart from the plates 39 a distance from about 0.010 to about 0.075 of an inch (measured when the idler disk 45 is pressed toward the rotor as far as possible). The idler disks also have an outer seal 57 that is positioned on a portion of the idler disk 45 that is adjacent the end wall 7 of the outer casing 3. The outer seals 57 extend in a direction towards the section 33 of the rotor 21. The outer seal 57 is spaced apart from the impeller portion 33 a distance from about 0.010 to about 0.002 of an inch (when the idler disk is in its normal operating position). The end 46 of the idler disk 45 that is spaced between the outer seal 57 and the end wall 7 of the outer casing 3 can converge in a direction towards the rotor 21 to form a knife edge at the outer diameter. The converging end 46 of the idler disk 45 reduces the effective area of this portion of the disk that tangentially non-symetrical pressure fields can act against and this reduces the radial loading on the idler disk. The inner seal 53 and outer seal 57 should be made of a material that is compatible with the fluid in the rotor cavity and should have a low galling tendency with the material of the plates 39 or section 33. Possible choices for the opposing seal face material can be teflon on steel, brass on steel, cast iron on steel or other suitable materials.

The inner seal 53 has a flat face that is adjacent and parallel to the surface of the plate 39 and the outer seal 57 has a flat face that is adjacent and parallel to the surface of the section 33 of the rotor 21. The inner and outer seals produce a sealing effect based solely on the close proximity of the seal face to the adjacent surface (the plate 39 or section 33). Typically the sum of the clearances between the inner seal and the plate and between the outer seal and the section 33 of the rotor 21 is about 0.015 to about 0.075 of an inch. The effectiveness of the seal, that is its ability to separate two regions of differing pressures without a great deal of leakage passing through the seal, is determined in part by the distance between the seal and the adjacent surface. Increased separation reduces seal effectiveness and increases leakage. The seals may be formed integrally with the idler disks or separately attached. Separately attaching the seals increases the range of material that can be used for the seals. Separately attached seals can be secured to the idler disk 45 by resistance welding, counter-sunk screws, gluing or other suitable securement means. The inner seal 53 should be located as close as possible to cylindrical shoulder 23. In practice it has been found that the inner seal 53 should be spaced from the shoulder 23 no more than about ⅛ of the radius of the idler disk 45. The outer seal 57 should be located to be adjacent the outer ½ of the section 33 of the rotor 21 that is adjacent the end wall 7 of the outer casing 3. In practice it has been found that it is preferable to have the outer seal spaced from the shoulder 23 a distance from about ½ to about 9/10 of the radius of the section 33 of said rotor 21. It has been found to be preferable to have the outer seal spaced from said shoulder about 5/6 of the radius of said section 33 of said rotor 21, the inner and outer seals act to limit the axial movement of the idler disk on the cylindrical shoulder 23.

The radial width of the outer seal should be as great as is practical. It has been found that a radial width of about 1/100 to about ¼ of the idler disk diameter is insufficient to provide the desired sealing effect, although a greater radial width will provide improved sealing effectiveness.

A plurality of slots 61 are positioned in the idler disk 45 between the inner seal 53 and the section 49 of the idler disk. The slots provide free communication between the side of the idler disk facing the sidewall 9 of the outer casing 3 and the side of the idler disk facing the rotor 21. Thus, the slot 61 provide a passageway from the side of the idler disk that is adjacent the section 33 of the rotor 21 and the side of the idler disk 45 that is adjacent the plate 39. The slots are designed to pass the seal leakage from one side of the idler disk 45 to the other without creating much flow resistance. Thus the slots 61 must be sized to effectively handle the leakage across the inner seal 53 and the outer seal 57. In practice it has been found that it is desirable to have less than approximately 3 pounds per square inch pressure drop across the slot 61 when the fluid is water. It has also been found that it is necessary to increase the size of the slot 61 with increases in the diameter of the idler disk. This is because there will be a greater amount of seal leakage that occurs with an increase in the diameter of the idler disk. Normally, the slots 61 have an area from about ¼ to about ¾ percent of the surface area of the idler disk with an area of about ½ percent of the surface area of the idler disk working particularly well.

Positioned on the surface of the section 33 of the rotor 21 and adjacent the idler disk 45 are vanes 65. The vanes 65 extend from a position adjacent the cylindrical shoulder 23 outwardly along the section 33 in a direction toward the end wall 7. The vanes 65 normally extend from the cylindrical shoulder 23 for a distance that is from about ⅓ to about ⅔ of the radius of the section 33 with a distance of about ½ of the radius of section 33 working particularly well. However, the vanes should always be located between the outer seal 57 on the idler disk 45 and the cylindrical shoulder 23. Thus, the vanes will never extend beyond the outer seal 57. The vanes may be cast as part of the rotor or they may be separate pieces which are bonded to the section 33. The vanes 65 can be secured to the impeller portion by bolting, welding, gluing or other securement means. The vanes may be either straight or curved although it has been found in practice that it is desirable to have the vanes 65 be straight and extend radially outwardly from the cylindrical shoulder 23. The vanes are used to increase the rotation rate of fluid mass in its immediate vicinity thereby increasing the pressure difference existing between the cylindrical shoulder 23 and the outer seal 57 between the idler disk and rotor 33.

Figure 3:
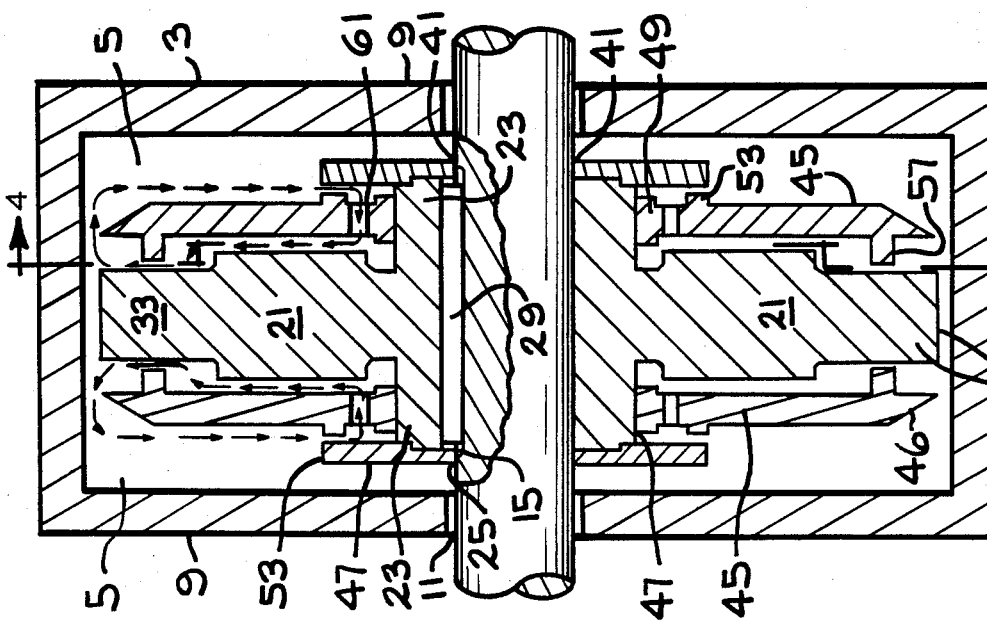
FIG. 3 is a cross-sectional side elevational view of the present invention.

In operation, the shaft 13 is caused to rotate and this in turn rotates the rotor 21 that is secured to the shaft. As the rotor 21 is caused to rotate the section 33 and vanes 65 (if present) attached to the rotor cause the fluid between the rotor and idler disks to be advanced radially towards the end wall 7 of the outer casing 3. This fluid movement reduces the pressure near the cylindrical shoulder 23 between the rotor 33 and plate 39. This reduced pressure causes fluid to flow from the area between the idler disk 45 and casing side wall 9. A fluid circulation about the idler disk and rotor is created as depicted in FIGS. 3 and 4.

As the rotor 21 rotates, the idler disks 45, located on each side of the section 33 of the rotor 21, rotate due to the frictional drag that is associated with the fluid being moved by the rotor. The idler disks 45 are dragged in the direction of rotation of the rotor 21 due to the inherent viscosity of the fluid in the rotor cavity 5. Since the idler disks 45 are positioned between the rotating rotor 21 and the stationary walls of the outer casing 3 the idler disks rotate at substantially ½ of the speed at which the rotor 21 is rotating. This assumes that the idler disks are positioned substantially midway between the stationary side walls of the outer casing 3 and the rotating rotor 21. If the idler disks 45 are closer to the rotor, the idler disks will rotate at a slightly faster speed and if the idler disk 45 are positioned closer to the stationary walls of the outer casing 3, the idler disks will rotate at a slightly slower speed. Assuming for the sake of convenience that the idler disks 45 are substantially midway between the rotor 21 and the stationary wall of the outer casing 3, the speed of rotation of the idler disks is approximately equal to the average velocity of the bounding surfaces on each side of idler disks. Since the walls of the outer casing are stationary and not moving, they will have a zero velocity so the average velocity of the bounding surfaces on each side of the rotating disks is ½ of the velocity of the rotating rotor 21.

The fluid mass located in the rotor cavity 5 between the idler disks 45 and the rotor 21 revolves at approximately the average velocity of the bounding surfaces. Since the idler disks are rotating at approximately ½ the velocity of the rotor, the fluid mass rotates at approximately ⅜ of the velocity of the rotating rotor. The fluid mass that is located between the idler disks 45 and the stationary walls of the outer casing 3 rotates at approximately the average velocity of the bounding surfaces of the fluid. Since the idler disks 45 are rotating at ½ the velocity of the rotor and the walls of the outer casing 3 are stationary, the fluid mass between the idler disk 45 and the side walls of the outer casing have an average velocity of approximately ¼ of the velocity of the rotating rotor.

A rotating mass of fluid generates a radial pressure gradient and the intensity of this gradient depends upon the rotation rate of the fluid. Specifically, the pressure developed by the rotating fluid follows a square relationship. For example, doubling the speed of rotation increases the pressure gradient by four times. As set forth above, the fluid located between the rotating idler disks 45 and the rotor 21 rotates about three times faster than the fluid located between the idler disks 45 and the stationary walls of the outer casing. 3. Therefore, the rotating fluid mass between the idler disks and the rotor generates a pressure gradient about nine times greater than the pressure gradient generated between the idler disks 45 and the walls of the outer casing 3. The unequal pressure gradients create a very strong force in the axial direction on the idler disks 45. Since the idler disks 45 are free to move in an axial direction along the cylindrical shoulder 23 of the rotor 21 it is necessary to develop a way to cancel out the axial forces acting on the idler disks 45 due to the unequal pressure gradients that are created due to the unequal speed of rotation of the fluid mass on each side of the idler disks 45.

As shown in FIG. 3, the differential in the rate of fluid rotation between the idler disks and rotor, and between the idler disks and the side walls of the outer casing 3 generates a high pressure differential between the idler disks 45 and the rotor 21, and a much lower pressure difference between the idler disks 45 and the side walls of the outer casing 3. A result of the pressure differences is that fluid in the rotor cavity 5 is caused to circulate as shown by the arrows in FIGS. 3 and 4. As can be seen, the fluid is pumped outward in a spiral motion between the idler disks and the rotor, and passes between the outer seals 57 and the section 33 of the rotor. The fluid is also drawn inward in a spiral motion between the idler disks 45 and the wall of the outer casing 3. This fluid passes between the inner seal 53 and the plate 39. The fluid also passes through the slots 61 so that the fluid can again be pumped outwardly between the idler disks 45 and the section 33 of the rotor 21.

During operation unbalanced pressure differentials can act to displace the idler disks 45 towards the rotor 21. When this occurs the outer seal 57 on the idler disks 45 are also advanced toward the section 33 of the rotor 21. This lessens the clearance between the outer seal 57 and the section 33 thereby increasing the sealing effectiveness of the outer seal. At the same time, the passage between the inner seal 53 and the plate 39 increases thereby reducing the sealing effectiveness of this seal. Because the inner seal 53 decreases in effectiveness, the pressure loss across the seal lessens resulting in a higher pressure between the plate and idler disk in the chamber 66. The pressure equalization slots 61 insures that this higher pressure also exists between the idler disks 45 and the section 33 of the rotor 21. At the same time the outer seal 57 is closer to the rotor 33 and this tends to increase the seal effectiveness which means that the pressure drop across the outer seal 57 increases. This higher sealing effectiveness allows the fluid rotation existing between the idler disks 45 and the section 33 to strengthen thereby creating a higher pressure thereby creating a pressure force on the idler disk that pushes the idler disk 45 axially away from the rotor 21. In addition, the higher pressure existing near the cylindrical shoulder 23 caused by the reduced effectiveness of the inner seal 53 also contributes to the higher pressure being present between the idler disks 45 and rotor 21.

If a pressure gradient displaces the idler disks 45 towards the side walls of the outer casing 3, the clearance between the outer seal 57 and the section 33 of the rotor increases and the clearance of the inner seal 53 with the plate 39 decreases. With an increase in the spacing between the outer seal 57 and the section 33, the effectiveness of the seal 57 decreases thereby reducing the pressure buildup being generated by the fluid rotation existing between the idler disks 45 and rotor 21 and allowing more fluid to pass through this seal. At the same time the clearance between the inner seal 53 and the plate 39 decreases and this improves the sealing effectiveness of the inner seal. This results in a higher pressure drop across the inner seal which, in turn, reduces the pressure existing in the chamber 66 between the plate 39 and idler disk 45. This lower pressure is communicated to the other side of the idler disk through the pressure equalization slots 61. The lower pressure caused by the increased effectiveness of the inner seal 53 and the decreased sealing effectiveness of the outer seal 57 operate together to reduce the overall pressure of the fluid between the idler disks 45 and rotor 21. This results in a restoring force acting to push the idler disks toward the rotor thereby canceling out the original displacement toward the side wall of the casing 3.

From the above it is clear that whenever the idler disk 45 leave their equilibrium position, somewhere between the inner and outer sealing surfaces axially locations, a strong pressure force is generated that acts in the opposite direction. Therefore, the idler disk is forced back towards the equilibrium position and the idler disk will operate at a location where the opposing forces are in equilibrium. The radial location of the inner and outer seals, the seal clearances, seal design and the physical properties of the fluid in the casing influence the strength of the force that tend to maintain the equilibrium position. Analysis of the factors involved show that the restoring force increases extremely rapidly when the idler disk is moved out of its equilibrium position. The idler disk can only move a very short distance before the restoring forces become greater than the displacing force and the idler disk is return to or at least near the equilibrium position. Analysis has shown that a movement of only 0.002 of an inch can create a restoring force of several thousands of pounds of force. The restoring force is generated in a very small fraction of a second from the time that the idler disk is initially displaced and at no time during the operation does the inner seal 53 contact the plate 39 or the outer seal 57 contact the section 33 of the rotor 21. As an example of the operation of the idler disks 45, in a typical application the axial movement possible by the idler disk is approximately 0.015 of an inch. At equilibrium, the idler disk is located such that the outer seal clearance 57 is about 0.005 of an inch and the inner seal clearance is about 0.01 of an inch. To force the idler disk even 0.001 of an inch closer to the section 33 of the rotor 21 would require a force of over 1,000 lbs. To force the idler disk 0.001 of an inch closer to the side wall of the casing 3 would likewise require over 1,000 lbs. of force. This resistance to axial displacement greatly exceeds the magnitude of the forces that would act to axially move the idler disks.

At no time during normal operation does the inner seal 53 contact the plate 39 or the outer seal 57 contact the section 33 of the rotor 21. Thus, there is usually very little wear on the inner and outer seals and they function very well to maintain the idler disks 45 in the desired operating position. In some instances, the inner seal 53 and outer seal 57 may suffer some erosion due the particular environment in which the idler disk operate (such as a centrifugal pump handling an abrasive slurry). This results in enlarged clearance between the inner seal 53 and the plate 39, and the inner seal 57 and the section 33 of the rotor 21. The enlarged clearances do not disrupt the functioning of the idler disks and the idler disk continue to operate in an equilibrium position. The enlarged clearances can produce a slight increase in the power loss due to drag due to the greater leakage across both the inner and outer seals.

Figure 5:
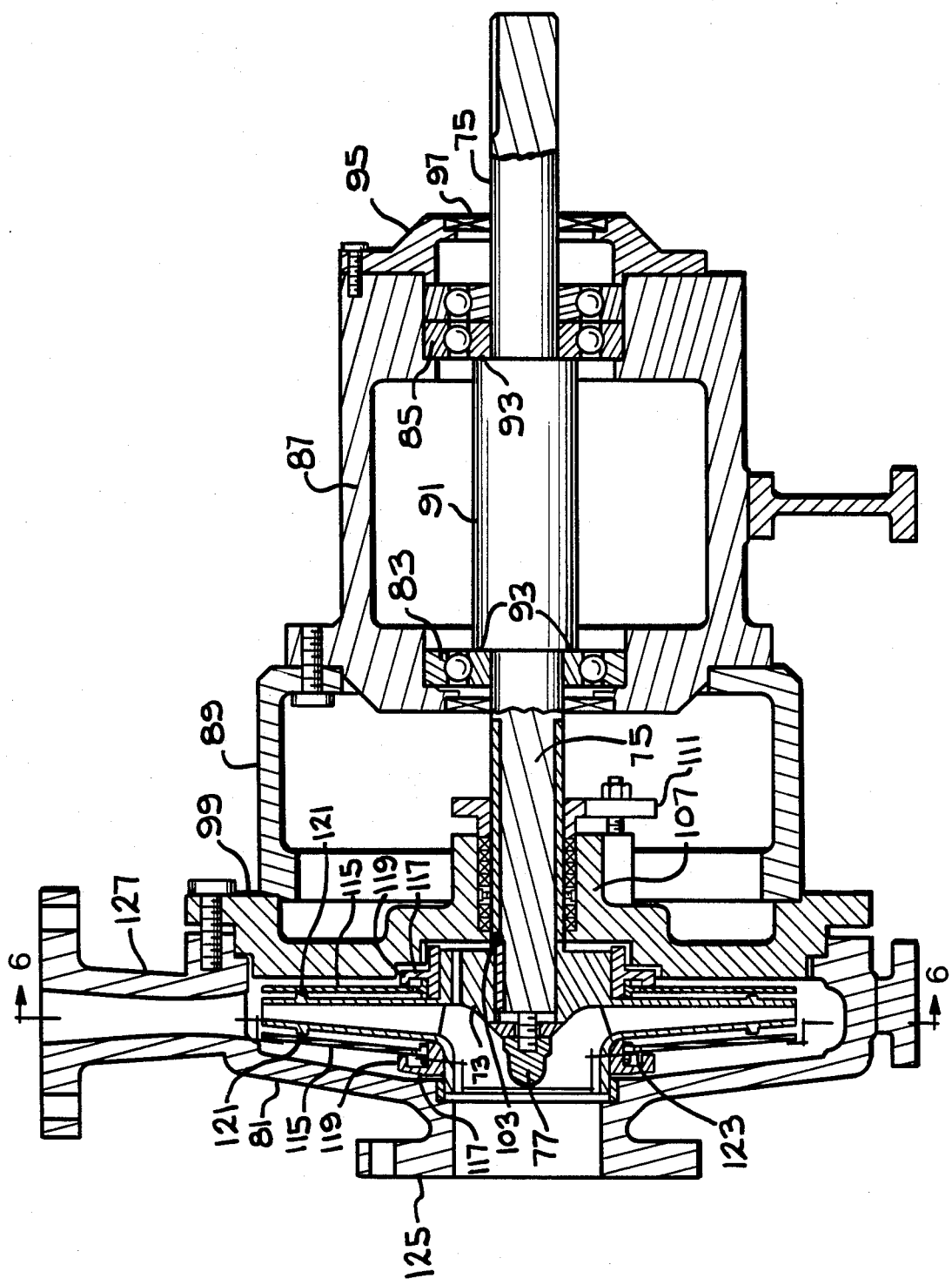
FIG. 5 is a cross-sectional side elevational view of another embodiment of the present invention.
Figure 6:
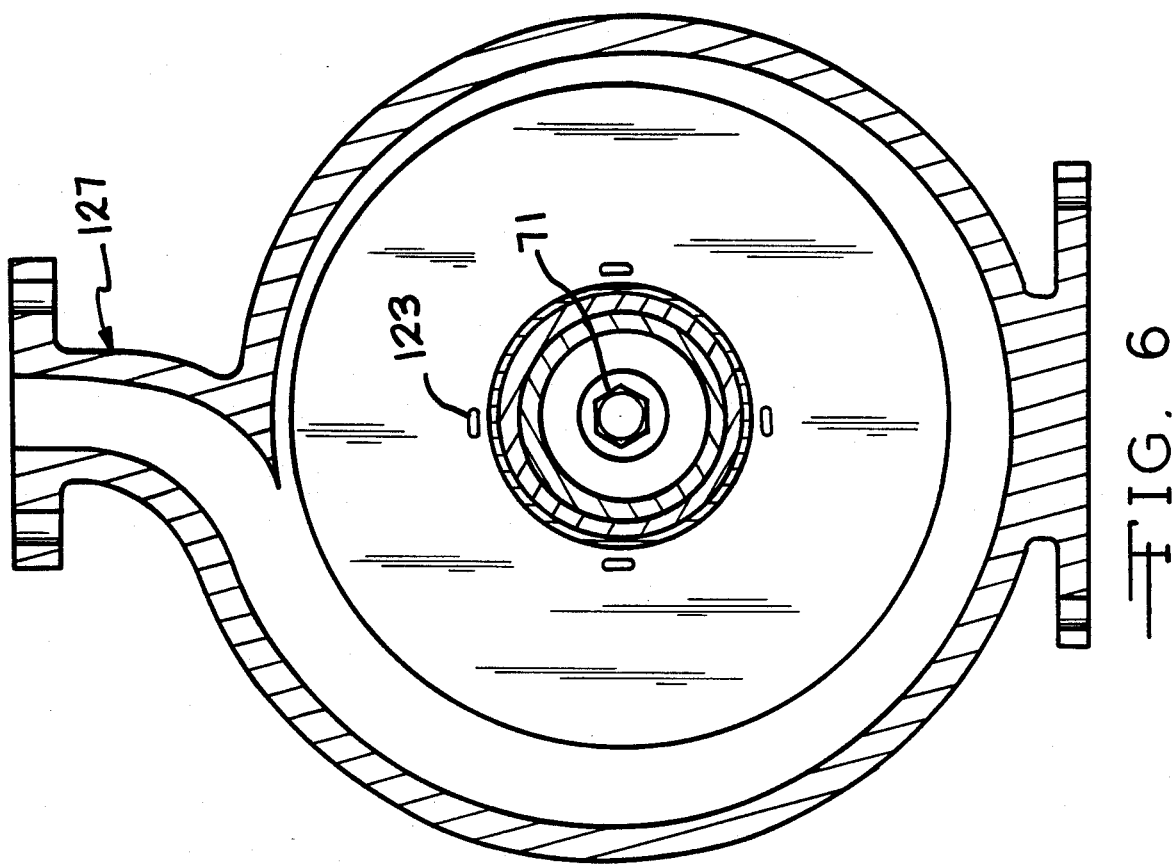
FIG. 6 is a cross-sectional view taken along line 6—6 in FIG. 5.

FIGS. 5 and 6 illustrate how the idler disk arrangement described can be used on an end suction single stage centrifugal pump 71. Although an end suction single stage centrifugal pump will be used to illustrate how idler disks are applied to centrifugal pumps, it should be clear that idler disks can be applied to a centrifugal pump of any construction. In this embodiment, a rotatable impeller 73 (or rotor) is positioned on a rotatable shaft 75. Normally, the impeller 73 is keyed to the shaft 75 and retained on the shaft with a nut 77. The impeller is located in a pumping cavity 79 formed by the outer casing 81 of the single stage centrifugal pump 71. The shaft 75 is supported by a first bearing 83 and a second bearing 85. The first and second bearings are located in a bearing housing 87 that is spaced apart from the pumping cavity 79. Positioned between the outer casing 81 and the bearing housing 87 is an adapter section 89. The first bearing 83 is positioned adjacent the adapter section 89 and the second bearing 85 is positioned spaced apart from the adapter section. The shaft 75 has a section of increased diameter 91 that is located between the first and second bearings. The section of increased diameter 91 forms a shoulder 93 that is adjacent the first bearing and a shoulder 93 that is adjacent the second bearing. The shoulders 93 of the section of increased diameter 91 cooperate with the first bearing 83 and second bearing 85 to support the shaft 75 and also to handle axial loads along the shaft. Positioned on the end of the bearing housing 87 that is spaced apart from the adapter section 89 is an end cap 95. A seal 97 is positioned in the center of the end cap 95. and extends around the shaft 75. The end cap and seal prevent contaminants from entering the bearing housing 87.

Connected to the outer casing 81 is a cover 99. The cover 99 forms the other side of the pumping cavity 79 where the impeller 73 is located. The adapter section 89 extends between the cover 99 and the bearing housing 87. The shaft 75 extends through the cover through opening 103. Leakage between the shaft and the cover is reduced by a stuffing box 107 containing packing rings 109 that are positioned around the shaft 75. A stuffing box gland 111 is used to compress the packing rings 109 around the shaft 75 to ensure an adequate seal.

Idler disks 115 are positioned on each side of the impeller 73. The idler disks 115 are mounted with a clearance fit on seal carriers 117 for the inner seals 119. Thus, the inner seals 119 are not positioned on the idler disks 115 but are carried on the seal carriers 117. The outer seals 121 are located on the impeller 73 and spaced radially outwardly from the seal carriers 117. Thus, the seals in this embodiment of the invention are not located on the idler disks 115 but are located on the impeller 73 and the seal carriers 117. There is a passageway 123 located in the idler disks 73 adjacent the inner periphery of the idler disk. The passageway 123 is located between the end of the idler disk that is positioned on the seal carriers 117 and the inner seals 119. The passageway provides communication between the fluid that is located on each side of the idler disks 115.

In normal operation, the shaft is caused to rotate resulting in the rotation of the impeller 73. This rotation generates a centrifugal force in the impeller which causes the fluid within the impeller to advance outwards and pass into the outer periphery of the casing and then into the discharge passage 127. The withdrawl of fluid from within the impeller passage allows more fluid to enter from the suction passage 125. This fluid is similarly pumped resulting in a continuous pumping action. As an unavoidable consequence of the normal operation of the pump, the void between the impeller 73 and the outer casing 81 and the cover 99 become filled with the fluid being pumped (typical fluids encountered in industrial pumping application include water, petroleum and its derivatives, and slurries).

The idler disks 115 are free to rotate and the rotating fluid in the pumping cavity 79 causes the idler disks to rotate in the same direction that the impeller 73 is rotating. The idler disks reduce the losses that contribute to friction drag of the pumped fluid as previously described and the idler disks move axially with respect to the inner and outer seals in the manner previously described. As set forth above, the idler disks are usually in a position substantially midway between the inner and outer seals and this establishes an equilibrium position for the idler disks. However, it should be understood that the equilibrium position for the idler disks does not have to be substantially midway between the inner and outer seal. The equilibrium position can be located almost any place axially along the shaft between the inner and outer seals. When the idler disks are displaced from this equilibrium position the seals act to generate fluid pressures that act upon the idler disks and return them to substantially the equilibrium position.

Figure 8:
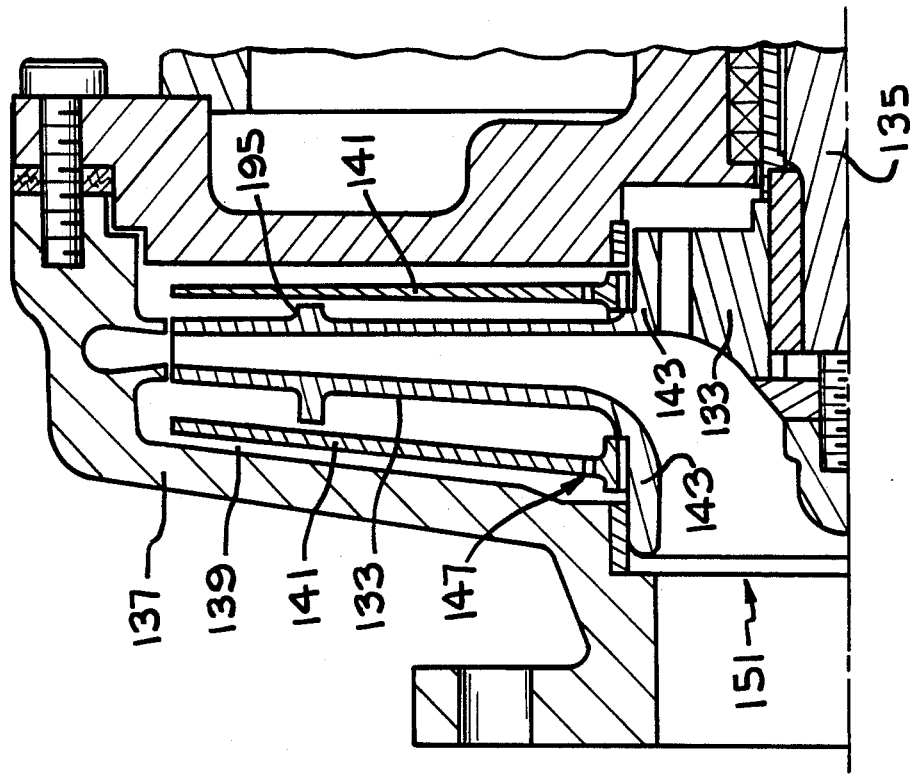
FIG. 8 is a partial cross-sectional side elevational view of another embodiment of the present invention.

FIG. 8 illustrates another embodiment of the idler disk invention. In this embodiment only a single outer seal is used for the idler disks. The idler disks are shown in the casing of an end suction single stage centrifugal pump that is very similar to the pump shown in FIG. 5. In this embodiment the impeller 133 is connected to a rotatable shaft 135. Surrounding the impeller 133 is an outer casing 137. The outer casing defines a pumping chamber 139 around the impeller 133. Located on each side of the impeller 133 are idler disks 141 and the idler disks are located between the impeller and the side walls of the outer casing 137. The idler disks 141 are mounted on a shoulder 143 on the impeller 133. The idler disks 141 are mounted with a clearance fit on the shoulder 143. The idler disks are free to rotate on the shoulder and also are free to move axially along the shoulder. An outer seal 145 extends from each side of the impeller 133 in a direction towards the idler disks 141. The outer seals 145 are positioned on the portion of the impeller 133 that is spaced apart from the shaft 135. Located on the inner periphery of the idler disks 141 are a plurality of throtting ports 147. The throttling ports are positioned in the idler disks 141 adjacent the shoulder 143 and the impeller 133. The throttling ports provide a path of communication between the portion of the pumping chamber 139 located between the wall of the outer casing 137 and the idler disks 141, and the portion of the pumping chamber located between the impeller 133 and the idler disks 141.

In operation the pump of this embodiment functions very much in the manner previously described with regard to the embodiment shown in FIG. 5. Fluid is drawn through the the rotating impeller 133 where the centrifugal forces generated by the rotating impeller increases the fluid pressure and cause it to move radially outwardly. The fluid is eventually discharged through an outlet in the outer periphery of the outer casing 137. The idler disks 141 act to reduce the fluid drag in the pumping chamber 139 defined by the outer casing 137 in the manner previously discussed. However, since the inner seal has been removed from this embodiment, the movement of the idler disks 141 is a little different. The fluid rotation between the idler disks and the impeller is faster than between the idler disk and the outer casing. This faster rotation generates a higher pressure on the impeller side of the idler disks than is generated on the casing side of the idler disks. The result of these two different pressures is that a fluid circulation is created so that fluid is pumped outwardly in a spiral motion between the idler disks and impeller, and is drawn inwardly in a spiral motion between the idler disks and the outer casing 137. As discussed previously, FIG. 3 shows the basic features of this rotation for the fluid. If during the operation of the pump, the idler disks are moved axially away from the impeller 133, the clearance between the outer seal 145 and the idler disks 141 increases. This reduces the sealing effectiveness between the outer seal 145 and the idler disks 141. The increased clearance between the outer seal and the idler disk increases the flow rate of fluid across the seal. The increased flow rate of fluid results in the pressure in the portion of the pumping chamber 139 located between the idler disks 141 and the impeller 133 to be reduced. This also results in a greater pressure loss through the throttling ports 147 located on the inner periphery of the idler disks 141. The combination of the decrease in the effectiveness of the outer seal and also the greater pressure loss through the throttling ports 147 acts to reduce the average pressure of the fluid that is located between the idler disks 141 and the impeller 133. Thus, the fluid pressure in the portion of the pumping chamber 139 that is between the outer casing 137 and the idler disks 141 acts upon the idler disks and forces the idler disks back towards the impeller 133.

If during the operation of the pump the idler disks 141 move toward the impeller, the clearance between the outer seal 145 and the idler disks 141 is reduced and this increases the effectiveness of the outer seal. Accordingly, there is a reduction in the leakage of the fluid through the seal. The reduced flow rate through the outer seal 145 reduces the pressure loss through the throttle ports 147 and this results in a higher pressure being generated in the portion of the pumping chamber 139 that is located between the idler disks 141 and the impeller 133. This higher pressure forces the idler disks away from the impeller 133. Thus, the outer seal 145 and the throttling ports 147 cooperate to maintain the idler disks 141 in an equilibrium position and also to ensure that the average pressure on either side of the idler disks balances out. It should be understood that the axial location of the equilibrium position for the idler disks 141 depends in part on the size of the throttling ports 147.

To ensure that the idler disks 141 are maintained in the proper equilibrium position, the total area of the throttling ports 147 located on an idler disk should be from about 0.01% to about 0.05% of the area of the idler disk. This ensures that there can be enough fluid flow through the throttling ports and a significant enough pressure loss through the throttling ports to maintain the idler disks 141 in the desired equilibrium position. As an example, it has been found that using a 12 inch diameter idler disk it is necessary to have substantially four throttling ports 147 each having a diameter of approximately ⅛ of an inch. With this combination the idler disks 141 are maintained in an equilibrium position so that there is a clearance of approximately 0.002 of an inch between the outer seal 145 and the idler disks 141.

Figure 7:
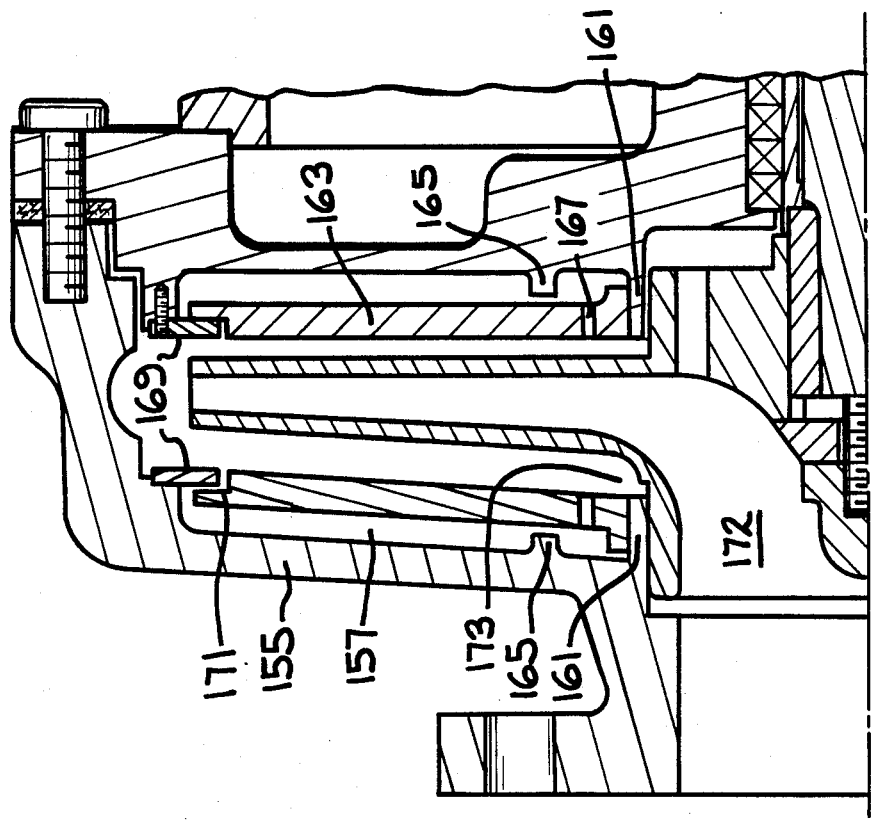
FIG. 7 is a partial cross-sectional side elevational view of another embodiment of the present invention.

FIG. 7 shows another embodiment of the idler disk invention. In this embodiment the idler disks run on stationary surfaces that are attached to the outer casing and there are no seals between the idler disks and the rotor. To describe this embodiment we will use a centrifugal pump that is very similar to the pumps that have previously been described. The pump has an outer casing 155 that defines a pumping chamber 157. An impeller 159 is rotatably positioned in the pumping chamber 157. Projections 161 extends from the outer casing 155 into the pumping chamber 157 adjacent the center of the impeller 159. The projections 161 provide a bearing surface upon which idler disks 163 can be mounted. The projections 161 also serve as stationary wear rings 162. Wear rings are used in centrifugal pumps to allow a close running clearance between the rotating impeller and the stationary casing as a means to reduce the rate of leakage from the high pressure region near the impeller to the low pressure region in the suction passage and in back of the impeller. Front and rear wear ring sets are located in the pumping chamber 157. Each wear ring set consists of a ring 164 mounted on the impeller 159 and a stationary ring 162 mounted on the outer casing 155. A very small clearance, usually less than 0.020 of an inch diametrical, separates the rotating and stationary rings. These rings are frequently used in centrifugal pumps to reduced leakage between the relatively high pressure area near the impeller and the low pressure area in the suction passage and behind the impeller. The idler disks 163 are free to move axially along the bearing surface provided by the projections 161. An inner seal 165 extends from the outer casing 155 in a direction towards the idler disks 163. The inner seal is located close to the center of the idler disks 163. Pressure equalization ports 167 are provided on the inner periphery of the idler disks that is located between the inner seals 165 and the projections 161. An outer seal 169 extends from the outer periphery of the outer casing 155. The outer seals 169 extend in a directions towards the idler disks 163. On the outer periphery of the idler disk 163 there is a counter bore 171 that cooperates with the outer seal 169 to provide the seal at the outer periphery of the idler disk. This arrangement for the outer seal provides a flush surface between the idler disks 163 and the outer seal 169. The flush surface the turbulence and the drag losses between the idler disks and the impeller 159.

In operation fluid is pumped through the pump of this embodiment basically as previously described. However, the operation of the idler disks is a little difference than previously described. If an idler disk 163 moves towards the impeller 159 then the clearance in the outer seal 169 decrease and the the decrease of the inner seal 165 increases. This results in the side of the idler disk that faces the outer casing 155 being exposed to a relatively low pressure near the inner periphery on the impeller side of the idler disk. Therefore the average pressure on the casing side of the idler disk is much less than the average pressure on the impeller side of the idler disk. This pressure differential acts to move the idler disk towards the casing side wall. If the idler disk moves towards the outer casing 155 then the clearance in the outer seal increases and the clearance in the inner seal decreases. This results in the casing side of the idler disk being exposed to a higher pressure at the outer periphery of the impeller. This raises the average pressure on the casing side of the idler disk to a value higher than the average pressure on the impeller side of the idler disk and this pressure force moves the idler disk towards the impeller. Thus, if the idler disk is moved from its equilibrium position the pressure forces on the idler disk created by the inner and outer seals act against the idler disk and move it to a point substantially at the equilibrium position where the axial pressure forces on the idler disk cancel out.

In operation, the embodiment depicted in FIG. 7, the wear ring leakage passes from the impeller outer periphery radially inward between the impeller and the idler disk. Then the leakage passes out between the wear rings. A very strong fluid rotation exists (especially if vanes are used) between the idler disk and the impeller. This rotation can generate a pressure equal to the pressure generated by the impeller. Therefore, the pressure near the impeller side of the wear ring may be no higher than the pressure in the suction passage thereby eliminating all leakage passing between the wear rings.

FIG. 9 shows another embodiment for the idler disk invention. In this embodiment a centrifugal pump 173 has an outer casing 175 defining a pumping chamber 177 with a rotatable impeller 179 located in the pumping chamber.

As shown in FIG. 9, it is also possible to mount the idler disk inner seal 187 on a removeable stationary ring 185. The inner seal can also be made adjustable as shown in FIG. 9. In this embodiment, the inner seal can be made to slide axially along a support shoulder 189 until the desired clearance is obtained with the idler disk. Then the inner seal can be locked into position advancing a set screw 191 to lock the inner seal in the desired position.

FIG. 9 shows another embodiment or feature of the present invention. In an centrifugal pump there is an annular space between the outer periphery of the impeller and the outer casing. This annular space provides a region where the rotating fluid discharged by the impeller can convert its high velocity into pressure energy. This annular space is called a vaneless diffuser and the annular space allows the fluid to adjust its flow angle to the angle of discharge. A gradual adjustment of the flow angle is accomplished by increasing the size of the annular space. The gradual adjustment of the flow angle reduces noise, vibration and abrasion type wear in the discharge area of the pump. However, the use of vaneless diffusers have been somewhat limited due to a low velocity to pressure conversion efficiency which is due to a high fluid drag loss between the rotating fluid mass and the stationary side walls of the casing. Thus, most pumps are designed to reduce the size of the annular space as much as possible to improve the efficiency of the pump. However, there are limits to reducing the annular space as the noise, vibration and turbulence of the pump fluid increase as the annular space is decreased. Thus, in designing a pump there must be a compromise between efficiency and acceptable operating features when designing the size of the annular space.

As shown in FIG. 9 the idler disks 174 extend beyond the outer periphery of the impeller 179 and into the annular space 176. Thus, the idler disks 174 form a rotating vaneless diffuser. The idler disks, in the region beyond the outer of the impeller 179, provide guidance of the fluid between the impeller discharge and the outer periphery of the casing. In addition, the idler disks reduce the relative velocity between the fluid discharge by the impeller and the adjacent bounding surface thereby reducing the fluid drag loss between the fluid discharge by the impeller and the stationary side walls of the casing. This reduced fluid drag loss increases the pressure developed by the pump. Thus, by extending the idler disks 174 beyond the outer periphery of the impeller 179 and into the annualr space 176 a larger annular space can be used without as significant impact in the decrease in efficiency of the pump.

It should also be recognized that the idler disk of the present invention do not have to be straight or flat in construction. It is possible to shape the idler disk to follow the contours of the particular impeller without effecting the basic principles of operation.

FIG. 10A-D show various configurations that can be utilized for the inner and outer seals for the idler disks of the present invention. As shown in previous embodiments, the seals can either be located on the idler disks, as shown in FIG. 1, on the rotor, as shown in FIG. 8, or on the outer casing as shown in FIG. 7. Thus, it should be appreciated that the configuration as shown in FIG. 10A-D can be either on the idler disk, the impeller, or on the outer casing.

FIG. 10A shows seals that are radially oriented. In this embodiment, the seal 193 extends radially outwardly from the idler disk 195 and terminates adjacent the rotatable impeller 197. FIG. 10B shows a conical arrangement for the seal. The seal 201 extends radially from the rotatable impeller 203. The end 205 of the seal that is spaced apart from the impeller 203 is formed at an angle. The angle shown is substanially a 45° angle. Although it should be understood that other angles can be used if desired. The outer periphery 207 of the idler disk is also disposed at an angle and the angle of the outer periphery 207 is substantially the same as the angle on the end 205 of the impeller 203. Thus, the end 205 of the impeller 203 cooperates with the outer periphery 207 of the idler disk 209 to form the seal.

In FIG. 10C the seal 211 extends radially outwardly from the casing 213. The seal 211 extends across at least a portion of the outer periphery 215 of the idler disk 217. This axial orientation between the seal 211 and the outer periphery 215 forms a seal for the idler disk 217.

FIG. 10D shows a different arrangement for the seal for the idler disk. In this embodiment, a plurality of ridges 221 extends from the idler disk 223. The ridges 221 extends in a direction toward the rotatable impeller 225. Extending from the impeller 225 are a plurality of flanges 227 that extend in a direction towards the idler disk 223. The ridges 221 and flanges 227 are in staggered relationship and the ridges and flanges extend far enough to overlap in the space between the idler disk 223 and the impeller 225. The overlapping staggered ridges 221 and flanges 227 form the seal between the idler disk 223 and the impeller 225.

Although the seals shown in FIG. 10A-D have been described as being located on the idler disk, impeller or outer casing, it should be recognized that these seal configurations can be located in different arrangement on these components to form the seal with the idler disk. As set forth above the seals may be placed on the idler disk, on the rotor or on the casing with very little impact on the functioning of the seals.

Figure 11:
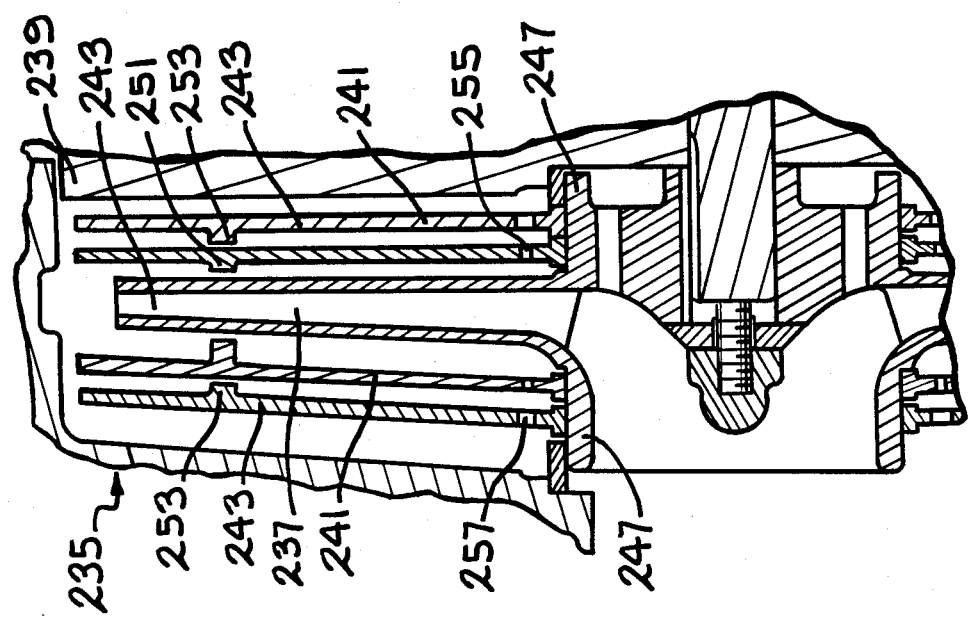
FIG. 11 is a cross-sectional side elevational view of another embodiment of the present invention.

FIG. 11 shows another embodiment of the idler disk invention. In this embodiment there is a centrifugal pump 235 having a rotatable impeller 237. The features of the centrifugal pump 235 are very similar to the features of the pump shown in FIG. 8, and all of the detail describing the centrifugal pump will not be repeated. There is, however, a major difference in that two idler disks are positioned in the pumping chamber 239 that surrounds the impeller 237. There is an inboard pair of idler disks 241 that are positioned adjacent the impeller 237. There is a pair of outboard impeller disks 243 that are positioned between the inboard idler disks 241 and the side walls 245 for the pumping chamber 239. The inboard and outboard idler disks are slideably positioned on a shoulder 247 located on the impeller 237. The inboard idler disks 241 have an outer seal 251 that is positioned adjacent the rotatable impeller 237. The outboard idler disks 243 have an outer seal 253 that is positioned adjacent the inboard idler disk. The outer seal 251 on the inboard idler disks and the outer seal 253 on the outboard idler disks are positioned in substantially the same plane and spaced radially outwardly substantially the same distance from the shoulder 247. The inboard idler disks have a plurality of throttle ports 255 that are positioned in a portion of the inboard idler disks that are adjacent the shoulder 247. The outboard idler disks have a plurality of throttle ports 257 and the throttle ports are also positioned in the portion of the outboard idler disks that are adjacent the shoulder 247. The centerline for the throttle ports 255 and the centerline for the throttle ports 257 are both spaced substantially equidistant from the shoulder 247. However, the throttle ports 257 have a diameter that is larger than the diameter of the throttle ports 255. It is important that the throttle ports 257 in the outboard idler disks 243 have a larger diameter because the outboard throttle ports 257 must pass the fluid pumped by both the outboard idler disks and the inboard idler disks.

Utilizing two idler disks on each side of the impeller further reduce the friction drag losses for such a centrifugal pump. If the impeller 237 is rotating at 3600 RPM the inboard idler disks 241 rotate at about 2400 RPM and the outboard idler disks 243 rotate at about 1200 RPM. The reduction in velocity between the side walls 245 of the pumping chamber 239 and the inboard idler disks 241 results in a greater reduction in the frictional drag than when only one idler disk is used on each side of the impeller. For example, the use of a single idler disk reduces the rotation rate of the fluid mass adjacent to the impeller from 1800 rpm to 900 rpm relative to the impeller or a 50% reduction. With two idler disks, the fluid mass adjacent to the impeller is reduced to only 600 rpm relative to the impeller or a 66% reduction. As discussed earlier, fluid drag loss usually follows a square relationship with velocity. Therefore, a velocity reduction to one-half of the original value reduces drag to one-fourth of its original value. A velocity reduction to one-third of the original value reduces drag to only one-ninth of the original value. Thus, it can be seen that utilizing two idler disks on each side of the impeller can be an effective way to further reduce the frictional losses in a centrifugal pump. It should be understood that it is possible to use additional idler disks to further reduce the frictional losses in a centrifugal pump. The primary limitation is the amount of space available for the idler disk, the added complexity for the pump, the added cost of making such a complex pump and the additional benefit to be received from adding additional idler disk. Each additional idler disk would contribute a smaller percentage of reduction of the frictional drag for the pump.

Figure 12:
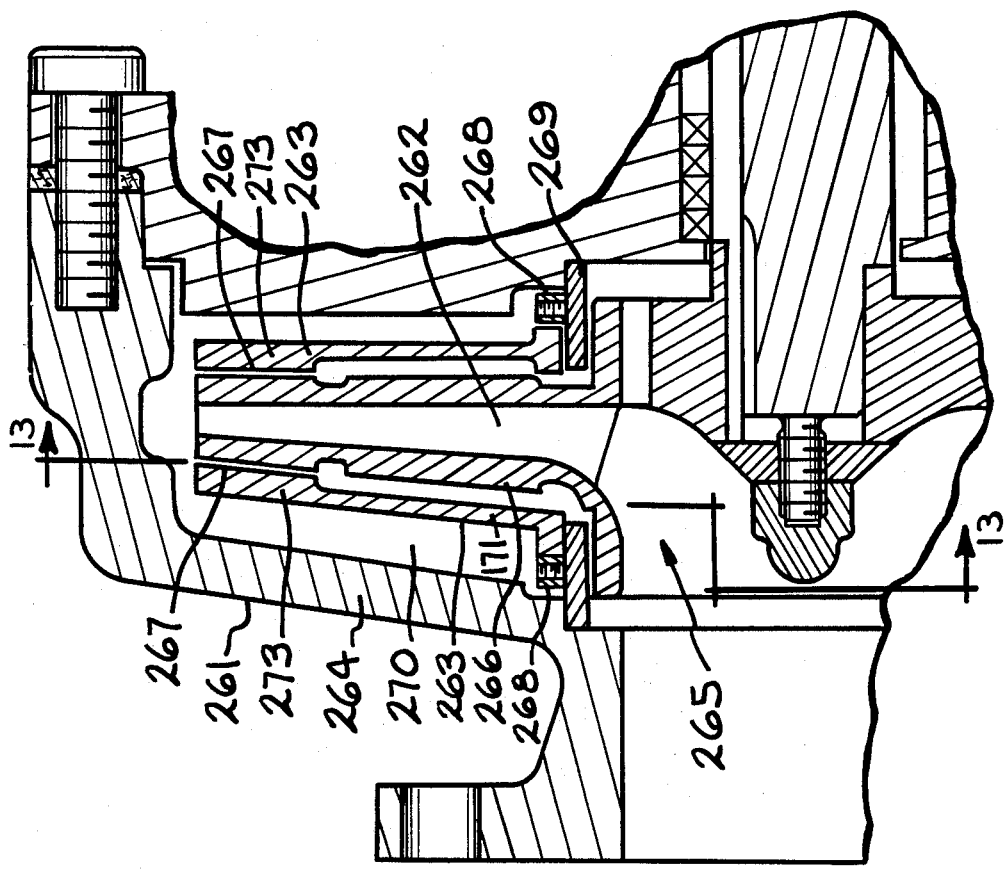
FIG. 12 is a partial cross-sectional side elevational view of another embodiment of the present invention.
Figure 13:
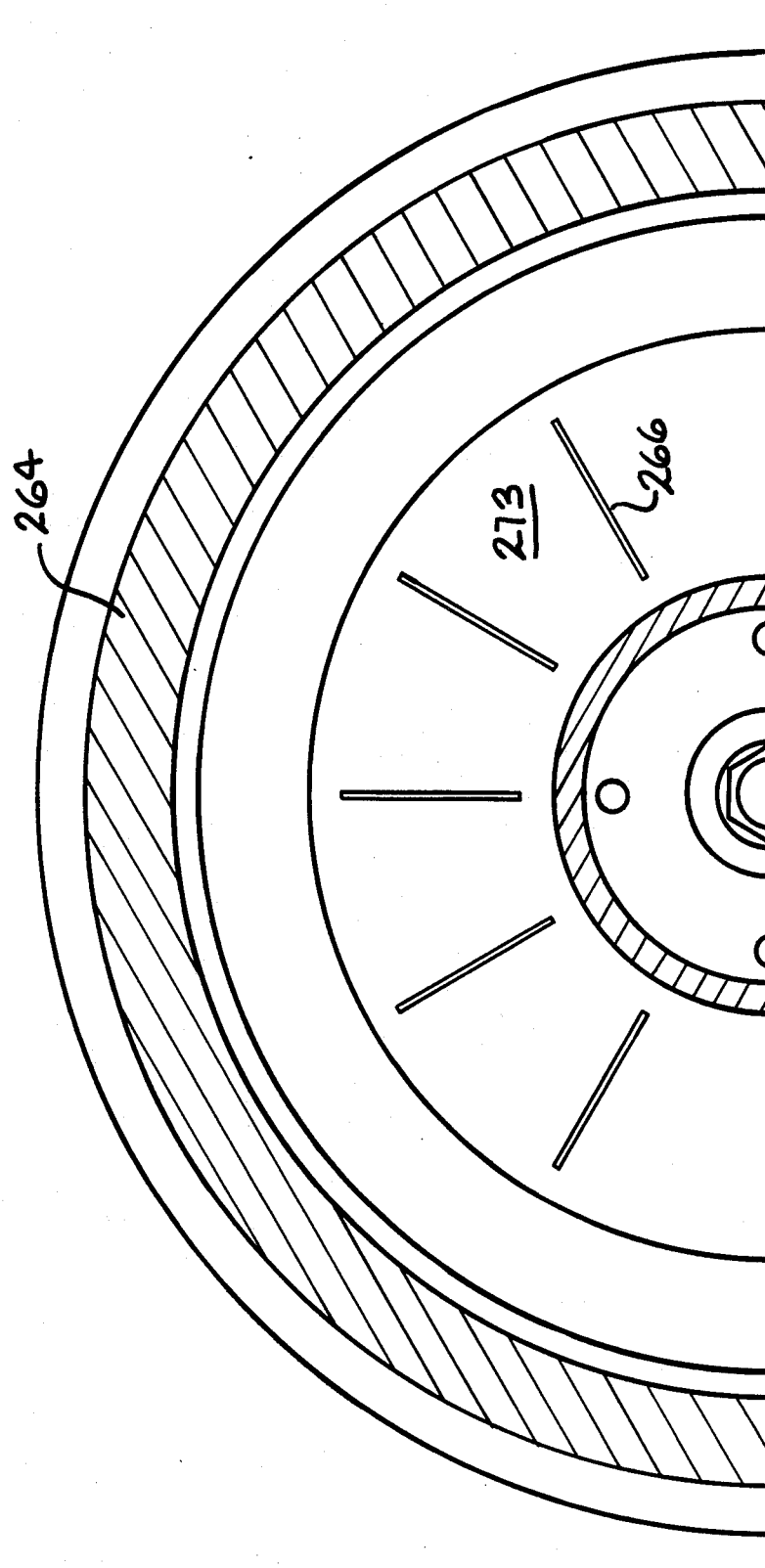
FIG. 13 is a cross-sectional view taken along line 13—13 in FIG. 12.

FIGS. 12 and 13 show another embodiment of the idler disk invention. In this embodiment there is a centrifugal pump 261 having a rotatable impeller 262 and idler disks 263. The features of the centrifugal pump 261 are very similar to the features of the pump shown in FIG. 8, and all of the details describing the centrifugal pump will not be repeated.

There are, however, two major differences. One major difference is that the idler disks 263 do not have any passageways near the inner periphery such as pressure equalization ports or throttling ports as previously described. Therefore, there is no communication between the casing side wall 264 and the impeller 262 near the inner periphery of the idler disks 263. The other major difference is that there are no wearing rings in use between the impeller and the idler disks. The chamber 271 located between the idler disks 263 and the impeller 262 is more or less in free communication with the suction passage 265. Vanes 266, attached to the impeller 262 are used to strengthen the fluid rotation in the region near the vanes. An outer seal 267 is positioned near the outer periphery of the disks 263.

The outer seal 267 is formed by a section 273 of enlarged cross section on the outer periphery of the idler disks 263. The section 273 extends in a direction towards the impeller 262 and forms the outer seal 267. The section 273 of enlarged cross section has a length from about $\frac{1}{8}$ to about $\frac{1}{3}$ of the radius of the idler disks and extends from the outer periphery of the idler disks towards the center of the idler disks.

An inner retainer ring 268 is attached to the shoulder 269 that extends from the casing side wall. The inner retainer ring is used to limit the axial movement of the disks 263 toward the casing side wall 264. The purpose of the inner retainer ring is to limit axial movement of the disk toward the casing side wall during pump start up or pump shut down or other conditions the may temporarily upset the normal operating conditions inside of the pump.

In operation, the rotating impeller 262 and attached vanes 266 generate a strong fluid rotation between the impeller 262 and disks 263. This rotary fluid motion is powerful enough to generate a pressure difference as great or slightly greater than the pressure generated by the impeller 262. This results in a small amount of fluid being pumped from the suction passage 265 through the space between the idler disks 263 and the impeller 262 into the discharge passage 273 on the outer periphery of the casing.

If the idler disks 263 move toward the impeller 262 then the outer seal clearance decreases thereby improving the sealing effectiveness. The increased effectiveness of the outer seal reduces the leakage rate between the impeller and the idler disks thereby allowing the pressure to build up in the region inside of the outer seal 267 between the idler disks 263 and the impeller 262. This higher pressure pushes the idler disk away from the impeller. If the idler disk moves toward the casing side wall 264 then the outer seal clearance increases thereby reducing the sealing effectiveness. The decreased effectiveness of the outer seal increases the leakage rate between the impeller and the idler disk thereby reducing the pressure in the region inside the outer seal 267 between the idler disk 263 and the impeller 262. This reduced pressure results in the idler disk moving toward the impeller back to its equilibrium position.

In a large centrifugal pump, up to 200 gallons per minute can leak through the wearing rings from the rotor cavity 270 into the suction passage 265. The idler disk of the above arrangement will completely eliminate this leakage. In addition, wearing rings periodically wear out and need replacement. The idler disk automatically maintains its equilibrium position regardless of the amount of wear that may occur at the outer seal.

Having described the invention in detail and with reference to specific materials it should be understood that such description is given only for the sake of explanation. Various modifications and substitutions other than those cited can be made without departing from the scope of the invention as defined by the following claims.

What we claim is:

1. An idler disk for reducing fluid drag forces in a machine having a rotating component comprising:
   an outer housing for said machine;
   a cavity defined in said outer housing, said cavity having opposed side walls;
   a rotatable component positioned in said cavity, said rotatable component being spaced apart from said side walls of said cavity;
   a freely rotatable idler disk positioned in said cavity, said idler disk being in spaced apart relationship with said rotatable component and one side wall of said cavity, said idler disk extending in said cavity along at least a portion of the length of said rotatable component, said idler disk is caused to rotate in the same direction as said rotatable component by the rotating fluid in said cavity, said fluid being caused to rotate by the rotation of said rotatable component, said rotating idler disk increasing the speed of said fluid rotating adjacent said rotatable component and thereby reducing the fluid drag on said rotatable component;
   an outer seal means forming a seal between said idler disk and said rotatable component to control the flow of fluid between the idler disk and the rotatable component; said outer seal means being positioned adjacent said outer periphery of said rotatable component and said idler disk; and
   at least one passageway positioned in said idler disk, said passageway being positioned in said idler disk adjacent said center of said idler disk, fluid in said cavity flowing through said passageway, said outer seal and said passageway acting to equalize the axial forces on the sides of the idler disk to maintain said idler disk in a desired equilibrium position where said idler disk is maintained in spaced apart relationship from said rotatable component and said side walls of said cavity.

2. The idler disk of claim 1 wherein a freely rotatable idler disk is positioned on each side of said rotatable component, said idler disks positioned in spaced apart relationship with said rotatable component and said side walls of said cavity.

3. The idler disk of claim 1 wherein said idler disk extends along substantially the length of said rotatable component.

4. The idler disk of claim 2 wherein said idler disk is a substantially circular thin disk that is mounted to be freely rotatable in said cavity.

5. The idler disk of claim 4 wherein said rotatable component is substantially circular in shape and said idler disk has a diameter that is from about ½ to about 1⅓ the diameter of said rotatable component.

6. The idler disk of claim 1 wherein said outer seal means and said passageway control the flow of fluid in said cavity to create a restoring force on said idler disk if said idler disk is displaced from said equilibrium position whereby said idler disk is returned to substantially said equilibrium position.

7. The idler disk of claim 1 wherein an inner seal means forms a seal between said idler disk and said cavity to control the flow of fluid between the idler disk and said cavity, said inner seal means being positioned adjacent the center of said idler disk.

8. The idler disk of claim 7 wherein said inner seal is positioned adjacent said passageway.

9. The idler disk of claim 8 wherein said passageway is positioned between said inner seal and said center of said idler disk.

10. The idler disk of claim 1 wherein from about 2 to about 8 passageways are positioned on said idler disk.

11. The idler disk of claim 10 wherein said passageways in said idler disk have an area from about ¼ percent to about 1 percent of the surface area of said idler disk.

12. The idler disk of claim 7 wherein said inner seal means and said outer seal means are positioned on said idler disk.

13. The idler disk of claim 12 wherein said inner seal means extends from said idler disk in a direction towards said cavity and said outer seal means extends from said idler disk in a direction towards said rotating component.

14. The idler disk of claim 7 wherein said outer seal means is positioned on said rotatable component and extends toward said idler disk, said inner seal means being located on said cavity and extending towards said idler disk.

15. The idler disk of claim 14 wherein a plate extends from said cavity adjacent said idler disks and said inner seal means is positioned on said plate.

16. The idler disk of claim 7 wherein said inner and outer seal means define the limits of movement in an axial direction for said idler disk.

17. A centrifugal pump for reducing fluid drag forces when pumping fluids comprising:
   an outer housing for said pump;
   a pumping cavity positioned in said outer housing, said pumping cavity having opposed and substantially parallel side walls;
   a rotatable impeller positioned in said pumping cavity, said impeller being disposed substantially parallel to said side walls of said pumping cavity, said sides of said impeller being spaced apart from side walls of said pumping chamber;
   said idler disks being in spaced apart relationship with said impeller and said side walls of said pumping chamber, said idler disks being disposed substantially parallel to said impeller, said idler disks extending in said pumping chamber substantially along said length of said impeller, said idler disks being caused to rotate in the same direction as said impeller by the rotating fluid in said pumping cavity, said fluid being caused to rotate by the rotation of said impeller, said rotating idler disks increasing the speed of said fluid rotating adjacent said impeller and thereby reducing the fluid drag on said impeller;
   an inner seal means forming a seal between said idler disks and said cavity to control the flow of fluid between the idler disks and said cavity, said inner seal means being positioned adjacent said center of said impeller;
   an outer seal means positioned adjacent said end of said idler disks that is adjacent said outer periphery of said impeller, said outer seal means forming a seal between the idler disks and said impeller to control the flow of fluid between said idler disks and said impeller; and,
   at least one passageway positioned in said end of said idler disks that is adjacent said inner seal means, said passageway being disposed between said inner seal means and said end of said idler disks that is adjacent said center of said impeller, fluid in said cavity flowing through said passageway said inner and outer seals and said passageway acting to equalize the axial force of the fluid on either side of said idler disks.

18. The pump of claim 17 wherein said idler disk is a substantially circular thin disk that is mounted to be freely rotatable in said cavity and moveable in an axial direction in said cavity, said impeller being substantially circular in shape.

19. The pump of claim 18 wherein said idler disks and said impeller are mounted to rotate around substantially the same axis.

20. The pump of claim 19 wherein said idler disks have a diameter that is from about ½ to about 1⅓ of the diameter of said impeller.

21. The pump of claim 20 wherein said pumping cavity forms a chamber around said outer periphery of said impeller, said chamber defining a discharge opening from said pumping cavity, said idler disks extending beyond said outer periphery of said impeller into said chamber, said idler disks rotating when fluid is being pumped from said chamber and said rotating idler disks reducing the drag on said fluid being discharged from said pumping cavity.

22. The pump of claim 17 wherein said inner seal means, said outer seal means, and said passageway control the flow of fluid in said pumping cavity around said idler disks to create a restoring force on said idler disks if said idler disks are displaced from said equilibrium position whereby said idler disks are returned substantially to said equilibrium position.

23. The pump of claim 17 wherein from about 2 to about 8 passageways are positioned on said idler disks.

24. The pump of claim 23 wherein said passageways on an idler disk have an area from about ¼ percent to about 1 percent of the surface area of said idler disk.

25. The pump of claim 17 wherein inner seal means and said outer seal means are positioned on said idler disks.

26. The pump of claim 25 wherein said inner seal means extends from said idler disks in a direction toward said wall of said outer housing and said outer seal means extends from said idler disks in a direction towards said impeller.

27. The pump of claim 26 wherein a plate extends from said outer housing and said inner seal forms a seal between said plate and said idler disks.

28. The pump of claim 17 wherein said outer seal means is positioned on said impeller and extends towards said idler disks.

29. The pump of claim 28 wherein a plate extends from said outer housing adjacent said idler disk and said inner seal is positioned on said plate.

30. The pump of claim 17 wherein said impeller defines a shoulder and said idler disks are positioned on said shoulder, said idler disks being free to move axially along said shoulder between said inner and outer seal means.

31. A centrifugal pump for reducing fluid drag forces when pumping fluids comprising:
an outer housing for said pump;
a pumping cavity positioned in said outer housing, said pumping cavity having opposed and substantially parallel side walls;
a rotatable shaft passing through substantially the center of said pumping cavity, said shaft being disposed substantially perpendicular to said side walls of said pumping cavity;
a rotatable impeller mounted on said rotatable shaft and positioned in said pumping cavity, said impeller being disposed substantially parallel to said side walls of said pumping cavity, said sides of said impeller being spaced apart from side walls of said pumping chamber;
a freely rotatable idler disk positioned in said pumping chamber on each side of said rotatable impeller, said idler disks being in spaced apart relationship with said impeller and said side walls of said pumping chamber, said idler disks being disposed substantially parallel to said impeller, said idler disks extending in said pumping chamber substantially along said length of said impeller, said idler disks being free to move axially in said pumping cavity, said idler disks being caused to rotate in the same direction as said impeller by the rotation of said fluid in said cavity, said fluid being caused to rotate by the rotation of said impeller, said rotating idler disks increasing the speed of said fluid rotating adjacent said impeller and thereby reducing the fluid drag on said impeller;
a first seal positioned on said idler disks, said first seal positioned on said end of said idler disks that is adjacent said rotatable shaft and said first seal extending from said idler disk in a direction towards said side walls of said pumping chamber, said first seal forming a seal between said idler disks and said cavity to control the flow of fluid between said idler disks and said cavity;
a second seal positioned on said end of said idler disks that is spaced apart from said rotatable shaft, said second seal extending from idler disks in a direction towards said impeller, said second seal forming a seal between said idler disks and said impeller to control the flow of fluid between said idler disks and said impeller;
a plurality of passageway positioned in said end of said idler disks that are adjacent said rotatable shaft, said passageways being disposed between said first seal and said end of said idler disks that is adjacent said rotatable shaft, said passageways having an area from about ¼ percent to about 1 percent of the area of said idler disk, said passageways acting to equalize the axial force of the fluid on either side of said idler disks to maintain said idler disks in a desired equilibrium position where said idler disks are maintained in spaced apart relationship from said impeller and said side walls of said pumping cavity; and,
radial vanes positioned on said impeller, said vanes positioned on each side of said impeller, said vanes extending along said impeller from a point adjacent said rotatable shaft to substantially said midpoint of said impeller, said vanes extending in a direction that is substantially perpendicular to said longitudinal axis of said rotatable shaft.

32. The pump of claim 31 wherein said first and second seals are positioned with the seal surface being substantially parallel to the surface of said idler disks.

33. The pump of claim 31 wherein said first seal has a seal surface that is disposed at an angle with respect to the surface of said idler disks, a plate extending from each side wall of said pumping cavity, said plates positioned adjacent said idler disks, said end of said plate being disposed at an angle, said angle on said plate being substantially the same as said angle on said seal surface, said plate terminating with said angle being adjacent said angled seal surface.

34. The pump of claim 33 wherein said second seal has a seal surface that is disposed at an angle with respect to the surface of said idler disks, said impeller having a projection positioned in alignment with and extending towards said second seal, said end of said projection that is spaced apart from said impeller being disposed at an angle, said angle on said projection being substantially the same as said angle on said seal surface.

35. The pump of claim 31 wherein a plate extends from each side of said pumping cavity, said plate being positioned substantially parallel to said idler disks, said plate terminating at an end that is positioned substantially perpendicular to said surface of said idler disks, said first seal extending from said idler disks over at least a portion of said end of said plate, said first seal being positioned immediately adjacent said end of said plate.

36. The pump of claim 31 wherein said first and second seal comprise a plurality of ridges that extend from said idler disks, said ridges being disposed substantially perpendicular to the surface of said idler disks, a plurality of flanges positioned on said impeller and said side walls of said pumping cavity, said flanges being disposed substantially perpendicular to said surface of said idler disks, said flanges on said side walls extending towards said first seal and being in staggered overlapping relationship with said ridges of said first seal, said flanges on said impeller extending towards said second seal and being in staggered overlapping relationship with said ridges of said second seal.

37. An idler disk for reducing fluid drag forces in a machine having a rotating component comprising:
an outer housing for said machine;
a cavity defined in said outer housing, said cavity having opposed side walls;
a rotatable component positioned in said cavity, said rotatable component being spaced apart from said side walls of said cavity;
a freely rotatable idler disk positioned in said cavity, said idler disk being in spaced apart relationship with said rotatable component and one side wall of said cavity, said idler disk extending in said cavity along at least a portion of the length of said rotatable component, said idler disk is caused to rotate in the same direction as said rotatable component by the rotating fluid in said cavity, said fluid being caused to rotate by the rotation of said rotatable component, said rotating idler disk increasing the speed of said fluid rotating adjacnet said rotatable component and thereby reducing the fluid drag on said rotatable component;
an outer seal means forming a seal between said idler disks and said side walls of said cavity to control the flow of fluid between the idler disk and the side walls of said cavity, said outer seal means being positioned adjacent said outer periphery of said idler disks; and,
at least one passageway positioned in said idler disk, said passageway being positioned in said idler disk adjacent said center of said idler disk, fluid in said cavity flowing through said passageway, said outer seal and said passageway acting to equalize the axial force on the sides of the idler disk to maintain said idler disk in a desired equilibrium position where said idler disk is maintained in spaced apart relationship from said rotatable component and said side walls of said cavity.

38. The idler disk of claim 37 wherein a freely rotatable idler disk is positioned on each side of said rotatable component, said idler disks positioned in spaced apart relationship with said rotatable component and said side walls of said cavity.

39. The idler disk of claim 37 wherein an inner seal means forms a seal between said idler disks and said side wall of said cavity to control the flow of fluid between said idler disk and said side walls of said cavity.

40. A method for reducing the losses due to fluid frictional drag in rotating machinery comprising:
rotating a component of said machinery in a cavity;
causing a freely rotatable idler disk positioned in said cavity to rotate due to the movement of the fluid in the cavity produced by the rotating component, said idler disk being positioned between said component and one side wall of said cavity;
creating a seal between the outer periphery of said idler disk and said component, said seal acting to control the flow of fluid between said idler disk and said component;
passing fluid through at least one passageway in the inner periphery of said idler disk, the flow of fluid across said seal and passing fluid through said passageway acts to equalize axial force on opposite sides of said idler disk to maintain said idler disk in the desired position between said side walls and said component whereby said idler disk is free to rotate and reduces the fluid frictional drag on said rotating component.

41. The method of claim 40 in which movement of said idler disk changes the effectiveness of said seal and changes the rate of fluid flow between said idler disk and said component, the change in said seal effectiveness acting to change the pressure on each side of said idler disk.

42. The method of claim 41 in which fluid flows through said passageway in a direction and at a rate that is dependent upon the pressure differential present on opposite sides of said idler disk.

43. The method of claim 42 in which changes in said seal effectiveness and the flow of fluid through said passageway generates a restoring force on said idler disk that causes said idler disk to return to a desired equilibrium position between said component and said side wall of said cavity.

44. The method of claim 40 in which a seal is created between the inner periphery of said idler disk and said side wall of said cavity.

45. The method of claim 40 in which a freely rotatable idler disk is positioned on each side of said component, said idler disks positioned in spaced apart relationship with said rotatable component and said side walls of said cavity.

46. The method of claim 45 in which at least two idler disks are positioned on each side of said component, said idler disks being caused to rotate due to movement of fluid in said cavity produced by the rotating component.

47. A method for reducing the losses due to fluid frictional drag in rotating machinery comprising:
rotating a component of said machinery in a cavity;
causing a freely rotatable idler disk positioned in said cavity to rotate due to the movement of the fluid in the cavity produced by the rotating component, said idler disk being positioned between said component and one side wall of said cavity; and, creating a seal between the outer periphery of said idler disk and said component, said seal acting to control the flow of fluid between said idler disk and said component to equalize axial forces on opposite sides of said idler disk to maintain said idler disk in the desired position between said side walls and said component whereby said idler disk is free to rotate and reduces the fluid frictional drag on said rotating component.

48. The method of claim 47 in which movement of said idler disk changes the effectiveness of said seal and changes the rate of fluid flow between said idler disk and said component, the change in said seal effectiveness acting to change the pressure on each side of said idler disk.

49. The method of claim 47 in which movement of said idler disk in a direction towards said side wall of said cavity is controlled by a stop positioned between said idler disk and said side wall of said cavity.

50. An idler disk for reducing fluid drag forces in a machine having a rotating component comprising:
   an outer housing for said machine;
   a cavity defined in said outer housing, said cavity having opposed side walls;
   a rotatable component positioned in said cavity, said rotatable component being spaced apart from said side walls of said cavity;
   a freely rotatable idler disk positioned in said cavity, said idler disk being in spaced apart relationship with said rotatable component and one side wall of said cavity, said idler disk extending in said cavity along at least a portion of the length of said rotatable component, said idler disk is caused to rotate in the same direction as said rotatable component by the rotating fluid in said cavity, said fluid being caused to rotate by the rotation of said rotatable component, said rotating idler disk increasing the speed of said fluid rotating adjacent said rotatable component and thereby reducing the fluid drag on said rotatable component; and,
   an outer seal means forming a seal between said idler disk and said rotatable component to control the flow of fluid between the idler disk and the rotatable component; said outer seal means being positioned adjacent said outer periphery of said rotatable component and said idler disk, said outer seal means acting to equalize the axial forces on the sides of the idler disk to maintain said idler disk in a desired equilibrium position where said idler disk is maintained in spaced apart relationship from said rotatable component and said side walls of said cavity.

51. The idler disk of claim 50 wherein a freely rotatable idler disk is positioned on each side of said rotatable component, said idler disks positioned in spaced apart relationship with said rotatable component and said side walls of said cavity.

52. The idler disk of claim 50 wherein a stop is positioned adjacent the inner periphery of said idler disk, said stop being positioned between said idler disk and said side wall of said cavity, said stop acting to control the movement of said idler disk in a direction towards said side walls.

53. The idler disk of claim 50 wherein said idler disk has an area of enlarged cross section located on the outer periphery of said idler disk, said area of enlarged cross section extending towards said rotatable component and forming said outer seal means.

54. The idler disk of claim 53 wherein said area of enlarged cross section has a length from about $\frac{1}{8}$ to about $\frac{1}{3}$ of the radius of said rotatable component, said area of enlarged cross section extending from the outer periphery of said idler disk in a direction towards said center of said idler disk.

* * * * *

UNITED STATES PATENT AND TRADEMARK OFFICE
CERTIFICATE OF CORRECTION

PATENT NO. : 4,830,572
DATED : May 16, 1989
INVENTOR(S) : Eli Oklejas Jr. and Robert Oklejas It is certified that error appears in the above—identified patent and that said Letters Patent is hereby corrected as shown below:

Column 22, line 42, claim 17, before the word "said" insert

--a freely rotatable idler disk positioned in said pumping chamber on each side of said rotatable impeller,--

Signed and Sealed this

Twenty-seventh Day of March, 1990

Attest:

JEFFREY M. SAMUELS

*Attesting Officer*   *Acting Commissioner of Patents and Trademarks*